United States Patent
Buonocore et al.

(10) Patent No.: US 11,385,327 B2
(45) Date of Patent: Jul. 12, 2022

(54) CUBESAT RADAR SYSTEMS

(71) Applicant: SRI INTERNATIONAL, Menlo Park, CA (US)

(72) Inventors: John J Buonocore, Menlo Park, CA (US); David Watt, Menlo Park, CA (US); Roman Y Novoselov, Menlo Park, CA (US); Steven Chen, Menlo Park, CA (US); Leon Tao, Menlo Park, CA (US); Mark Schutzer, Menlo Park, CA (US)

(73) Assignee: SRI International, Menlo Park, CA (US)

( * ) Notice: Subject to any disclaimer, the term of this patent is extended or adjusted under 35 U.S.C. 154(b) by 339 days.

(21) Appl. No.: 16/586,038

(22) Filed: Sep. 27, 2019

(65) Prior Publication Data

US 2020/0124705 A1  Apr. 23, 2020

Related U.S. Application Data

(60) Provisional application No. 62/743,660, filed on Oct. 10, 2018.

(51) Int. Cl.
*G01S 7/35* (2006.01)
*G01S 13/02* (2006.01)
*G01S 13/95* (2006.01)

(52) U.S. Cl.
CPC .......... *G01S 7/352* (2013.01); *G01S 13/0209* (2013.01); *G01S 7/358* (2021.05); *G01S 13/955* (2013.01)

(58) Field of Classification Search
CPC .... G01S 13/955; G01S 13/0209; G01S 7/358; G01S 7/352

(Continued)

(56) References Cited

U.S. PATENT DOCUMENTS 8,437,299 B2 * 5/2013 Pan .................. H03M 3/47
                                                 370/329
10,261,179 B2 * 4/2019 Davis .................. G01S 13/87
(Continued)

FOREIGN PATENT DOCUMENTS

KR       101305386 B1 *  9/2013  ........... H04B 1/0003

OTHER PUBLICATIONS

Vulcan Wireless Inc., accessed Aug. 17, 2015, http://www.vulcanwireless.com/products/mbt.

(Continued)

*Primary Examiner* — Erin F Heard
*Assistant Examiner* — Taher Al Sharabati
(74) *Attorney, Agent, or Firm* — McDonnell Boehnen Hulbert & Berghoff LLP

(57) ABSTRACT

Implementation of radio frequency applications in satellite environments can be constrained by size, mass, cost, and power limitations. These applications can include radar, communications, radio astronomy, or other scientific or industrial applications. A variety of systems are provided to facilitate recording of baseband radio frequency signals at high bandwidth and low power using low-cost components. These systems include field-programmable gate arrays or other programmable logic devices integrating between high-frequency ADCs and two or more multiplexed non-volatile storage mediums. Also provided are systems for providing calibration and self-test functionality in a low-cost, flexible, low-power radio frequency frontend. These systems include high-frequency switches configured to allow a calibration and/or self-test pulse to be acquired for each radar pulse generated by the system.

23 Claims, 12 Drawing Sheets

(58) Field of Classification Search
USPC .......................................................... 342/21
See application file for complete search history.

(56) References Cited

U.S. PATENT DOCUMENTS

2019/0064341 A1\* 2/2019 Bunch .................. G01S 13/955
2020/0025899 A1\* 1/2020 Starzer ................. G01S 13/931

OTHER PUBLICATIONS

Luire, H., Nanosatellites and the Software-Defined Radio Revolution, accessed Aug. 17, 2015, https://californiaconsultants.org/event/nanosatellites-and-the-software-defined-radio-revolution/.
ZYNQ, SoCs with Hardware and Software Programmability, accessed Jan. 31, 2020, https://www.xilinx.com/products/silicon-devices/soc/zynq-7000.html.
Lee e tal., SRI CubeSat Imaging Radar for Earch Science (SRI-CIRES), 2015, https://esto.nasa.gov/forum/estf2015/presentations/Wye_S6P8_ESTF2015.pdf.
USRP™ N200/N210 Networked Series, Sep. 14, 2012, https://www.ettus.com/wp-content/uploads/2019/01/07495_Ettus_N200-210_DS_Flyer_HR.pdf.
RTL-SDR.com, accessed Aug. 21, 2015, http://www.rtl-sdr.com/about-rtl-sdr/.
Swift™—XTS, "High Throughput X-band Downlink with S-band Transceiver", Tethers Unlimited, https://www.spaceflight.com/wp-content/uploads/2015/05/Brochure_SWIFT_XTS.pdf.
USRP E310 Embedded Software Defined Radio (SDR)—Ettus Research, https://www.ettus.com/all-products/e310/.

\* cited by examiner

| Performance Metric | Pathfinder Performance Goal | Prototype Performance Goal | SRI RFPU Performance |
|---|---|---|---|
| Maximum operating power dissipation | 100 W | 50 W | 29 W |
| Maximum standby power dissipation | 200 mW | 100 mW | 0* W |
| Computing efficiency | 22.5 GOps/W | 210 GOps/W | 20 GOps/W (real-time) or 60 GOps/W (post-processing) |
| Real-time computing | 100 Ops per digital sample | | >100 Ops per digital sample |
| Mass | 7 kg | 5 kg | 0.9** kg |
| Waveform bandwidth | ≥100 MHz | ≥200 MHz | 200 MHz (14-16 bits per I/Q channel) |
| Modulation/Demodulation | Arbitrary waveform generation: frequency, phase, and amplitude | | BPSK, QPSK, FSK, QAM, CDMA, OFDM, LFM, SATCOM; reprogrammable to support additional waveforms. |
| Dynamic Range | Support modern high-bandwidth modulation schemes (e.g., 64 QAM) | | 72 dB dynamic range with 14 bit ADC, 16 bit DAC; sufficient dynamic range for higher-order time domain modulations & high peaking factor variants (e.g., OFDM) |
| Signal Processing Capable | Representative functions: Time-series correlator, FFT, digital filtering, STAP | | 512 GFLOP/s Tegra GPU processing power & 900 MAC/s FPGA support basic DSP algorithms such as FFT, correlations, as well as advanced processing like SAR image processing and STAP. |
| Encryption | Compatibility desired | | Layered defense with both symmetric encryption (e.g., 128 bit AES, HMAC) and authentication (e.g., PKI with ECC) |
| Compression | Compatibility desired | | Both lossy & lossless HW-accelerated HDL implementations in Zynq FPGA and C/C++ SW-based algorithms in Zynq ARM. GPU supports advanced image compression (e.g., DCT-based, DWT-based algorithms). |
| Other Capabilities | Doppler frequency compensation | | Requires simple interpolation in the freq. domain; Zynq processors are well suited |

\* Maximum power dissipation for standby operation depends on desired system-ready time. We can achieve 0 W maximum power dissipation and system-ready time of 10 s if we power the RFPU down. We can achieve 1.5 W max power dissipation with <1 s system-ready time with processor in sleep mode. System-ready time of current microsatellite-compatible SDRs can be up to 1 min long.
\*\* Mass estimate includes weight of enclosure and supporting electronics/subsystems.

FIG. 6

| Operational Mode | Description of Mode | Peak Power Consumption |
|---|---|---|
| Mode 1: Power Off | RFPU is turned off and nominally takes 10 s to fully boot up the Tegra. This could be a normal operating mode to reduce power consumption on the satellite when the RFPU is not required. | 0 W |
| Mode 2: Standby | Only the Tegra is on and in low-power sleep mode, ready to turn on the other RFPU subsystems, depending on the requested mode. | 1.5 W |
| Mode 3: Idle | RFPU components (Zynq, Tegra, SSDs) are all in low power standby mode, ready for immediate use. | 4 W |
| Mode 4: Communication Repeater | *FPGA, CPU.* RFPU is commanded to receive a transmission, perform real-time error corrections, Doppler, and delay corrections, and retransmit the message. In this mode the received data is not stored but is processed in real time by the Zynq unit. The SSDs are powered off and the Tegra processor is in low power sleep mode. Example application: transponder, communications with legacy radios. | 7 W |
| Mode 5: Raw Sample Collection | *FPGA, SSDs.* RFPU is receiving RF data and, after minimal filtering and PPS synchronization, passes the samples to non-volatile SSDs. Only the programmable logic (PL) on the Zynq device is active; the ARM cores are powered off. The Tegra processor is in low-power sleep mode. Example application: basic radio. | 13 W |
| Mode 6: Sample Collection with Real-time Processing | *FPGA, CPU, SSDs.* RFPU is receiving RF data, which is being processed in real time by the Zynq device and stored in the SSDs. Both the PL and ARM cores on the Zynq device are active. The Tegra processor is in low-power sleep mode. Example application: store and forward, complex radio. | 16 W |
| Mode 7: GPU-augmented Real-time Processing | *FPGA, GPU, CPU.* RFPU is performing intensive signal processing in near-real-time via the Tegra GPU cores and a fast gigabit Ethernet connection between the Zynq and the Tegra. The Zynq and the Tegra processors are fully active, but the SSDs are powered off. Example application: detection of brief/intermittent signals, acquisition of signal with unknown Doppler frequency. | 25 W |
| Mode 8: Data Post-processing | *CPU, GPU, SSDs.* RFPU is performing computationally intensive signal processing. Both the CPU and GPU cores on the Tegra are tasked at near 100%. The Zynq device is completely powered off. | 27 W |
| Mode 9: Communication with Post-processing | *FPGA, CPU, GPU, SSDs.* RFPU is fully active, performing two independent applications: (1) communication function and (2) post-processing of data in the SSDs. Example application: electronic warfare, geolocation, advanced sensing (e.g., SAR). | 30 W |

FIG. 7

CUBESAT RADAR SYSTEMS

CROSS-REFERENCE TO RELATED APPLICATION

This application claims priority to U.S. Provisional Patent Application No. 62/743,660, filed Oct. 10, 2018, which is incorporated herein by reference.

This invention was made with Government support under contract no. NNX15AB27G awarded by the National Aeronautics and Space Administration (NASA). The Government has certain rights in this invention.

BACKGROUND

Unless otherwise indicated herein, the materials described in this section are not prior art to the claims in this application and are not admitted to be prior art by inclusion in this section.

There is a need for radar instrumentation capability onboard small spacecraft and other low-flying remoting sensing systems. These platforms are often space, mass, and/or power limited. Currently available hardware is too generalized, including a range of functionality that is not used. Accordingly, the portions of the current hardware devoted to this unwanted functionality can occupy portions of the space, mass, and power budget without providing any benefit.

SUMMARY

Microsatellite-compatible RF systems to-date have been low-performance and are often custom designed for specific applications (such as narrowband data download). The disclosed architecture is high-performance and highly flexible, capable of supporting multiple, diverse missions (such as broadband communications and RF signal collection). The embodiments described herein provide radio frequency transmit and receive functionality (e.g., to implement a monostatic radar or some other radar application) with built-in-test functionality. These embodiments also provide for efficient, low-power recording of high-bandwidth information related to the radio operation (e.g., radar return signals) in a deep, non-volatile storage medium. Accordingly, the disclosed embodiments provide radio transmit and receive functionality, along with high-bandwidth data recording and processing related thereto, in a manner that requires less space, mass, and power than previous systems.

Some embodiments of the present disclosure provide a radar system providing increased sample storage bandwidth for storage of baseband samples of radar signals between 100 MHz and 9 GHz with reduced power and cost. The radar system includes: (i) a digital-to-analog converter; (ii) a transmitter, wherein the transmitter is configured to receive one or more outputs from the digital-to-analog converter and generate a radar output signal therefrom; (iii) a receiver, wherein the receiver is configured to receive a radar input signal and output one or more demodulated output signals; (iv) an analog-to-digital converter, wherein the analog-to-digital converter is configured to receive the one or more demodulated output signals from the receiver; (v) a first non-volatile storage interface and a second non-volatile storage interface; and (vi) a controller. The controller includes one or more processors configured to: (a) operate the digital-to-analog converter and the transmitter to generate the radar output signal; and (b) operate the analog-to-digital converter and the receiver to generate a plurality of samples of the one or more demodulated output signals, wherein the one or more demodulated output signals are related to the generated radar output signal. The controller includes a programmable logic device that is coupled to the analog-to-digital converter and to the first and second volatile storage interfaces and that is configured to (1) receive the generated plurality of samples from the analog-to-digital converter, (2) transmit a first subset of the generated plurality of samples via the first non-volatile storage interface, and (3) transmit a second subset of the generated plurality of samples via the second non-volatile storage interface.

Some embodiments of the present disclosure provide a method providing increased sample storage bandwidth for storage of baseband samples of radar signals between 100 MHz and 9 GHz with reduced power and cost The method includes: (i) operating a digital-to-analog converter and a transmitter to generate a radar output signal, wherein the transmitter is configured to receive one or more outputs from the digital-to-analog converter and generate the radar output signal therefrom; (ii) operating an analog-to-digital converter and a receiver to generate a plurality of samples of one or more demodulated output signals, wherein the one or more demodulated output signals are related to the generated radar output signal, wherein the receiver is configured to receive a radar input signal and output one or more demodulated output signals, and wherein the analog-to-digital converter is configured to receive the one or more demodulated output signals from the receiver; (iii) receiving, by a programmable logic device, the generated plurality of samples from the analog-to-digital converter; (iv) transmitting, by the programmable logic device, a first subset of the generated plurality of samples via a first non-volatile storage interface; and (v) transmitting, by the programmable logic device, a second subset of the generated plurality of samples via a second non-volatile storage interface.

Some embodiments of the present disclosure provide a radar system providing improved versatility and accuracy for generation and sampling of radar signals between 100 MHz and 9 GHz at reduced power and reduced component cost. The radar system includes: (i) a digital-to-analog converter; (ii) a transmitter, wherein the transmitter is configured to receive one or more outputs from the digital-to-analog converter and generate a radar output signal therefrom; (iii) an antenna port; (iv) a receiver, wherein the receiver is configured to receive a modulated input signal and output one or more demodulated output signals; (v) a first switch coupled to the transmitter, the antenna port, and the receiver, wherein the first switch is operable to controllably direct the radar output signal from the transmitter to one of the antenna port or the receiver; (vi) an analog-to-digital converter, wherein the analog-to-digital converter is configured to receive the one or more demodulated output signals from the receiver; and (vii) a controller. The controller includes one or more processors configured to: (a) operate the digital-to-analog converter and the transmitter to generate the radar output signal, wherein the radar output signal comprises a plurality of transmit pulses, and wherein the radar output signal additionally comprises, for each of the transmit pulses, a corresponding calibration pulse; (b) operate the first switch to direct the transmit pulses to the antenna port and to direct the calibration pulses to the receiver; and (c) operate the analog-to-digital converter and the receiver to generate a plurality of samples of the one or more demodulated output signals, wherein the one or more demodulated output signals are related to the plurality of transmit pulses and the plurality of calibration pulses.

Some embodiments of the present disclosure provide a method providing radar operations with improved versatility and accuracy for generation and sampling of radar signals between 100 MHz and 9 GHz at reduced power and using reduced-cost hardware. The method includes: (i) operating a digital-to-analog converter and a transmitter during a first plurality of periods of time to generate a plurality of transmit pulses, wherein the transmitter is configured to receive one or more outputs from the digital-to-analog converter and to generate a radar output signal therefrom; (ii) operating a first switch, during the first plurality of periods of time, to direct the radar output signal from the transmitter to an antenna port; (iii) operating an analog-to-digital converter and a receiver to generate a first plurality of samples of one or more demodulated output signals, wherein the receiver is configured to receive a modulated input signal and output the one or more demodulated output signals to the analog-to-digital converter, wherein the one or more demodulated output signals are, during the first plurality of periods of time, related to the plurality of transmit pulses; (iv) operating the digital-to-analog converter and the transmitter during a second plurality of periods of time to generate a plurality of calibration pulses, wherein periods of time of the first plurality of periods of time alternate with periods of time of the second plurality of periods of time; (v) operating the first switch, during the second plurality of periods of time, to direct the radar output signal from the transmitter to the receiver; and (vi) operating the analog-to-digital converter and the receiver to generate a second plurality of samples of one or more demodulated output signals, wherein the one or more demodulated output signals are, during the second plurality of periods of time, related to the plurality of calibration pulses.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIGS. 5A-1 and 5A-2 are a schematic of an example RF frontend.
FIGS. 5B-1 and 5B-2 are a schematic of an example RF frontend and controller. The design is frequency agile, capable of operating at frequencies between 100 MHz and 9 GHz. The power amplifier (PA) module has the option of switching between multiple PAs depending on the mission requirements.
FIG. 6 shows performance metrics for various example embodiments.
FIG. 7 shows performance metrics for various power modes according to an example embodiment.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

It can be beneficial in a variety of space-based applications to store, in a nonvolatile storage medium, large amounts of high-bandwidth data as it is generated. This data can include baseband radar return signals or other radio frequency (RF) related baseband signals. Such applications could include recording down-modulated signals related to RF communications, RF astronomy, monostatic radar, weather radar, synthetic aperture radar, or other applications in order to later re-transmit the recorded signals, encrypt, compress, or otherwise process the recorded signals, or to perform some other operations on the recorded signals. Such recording and other processes may be performed alternatively (e.g., alternative between data generation and recording and data analysis) in order to keep within a specified power budget. However, such protracted high-bandwidth recording can be difficult to accomplish within the strict size, mass, cost, and power constraints of a satellite (e.g., cubesat, micro-satellite, or nano-satellite) or other space-based application.

Figure 1:
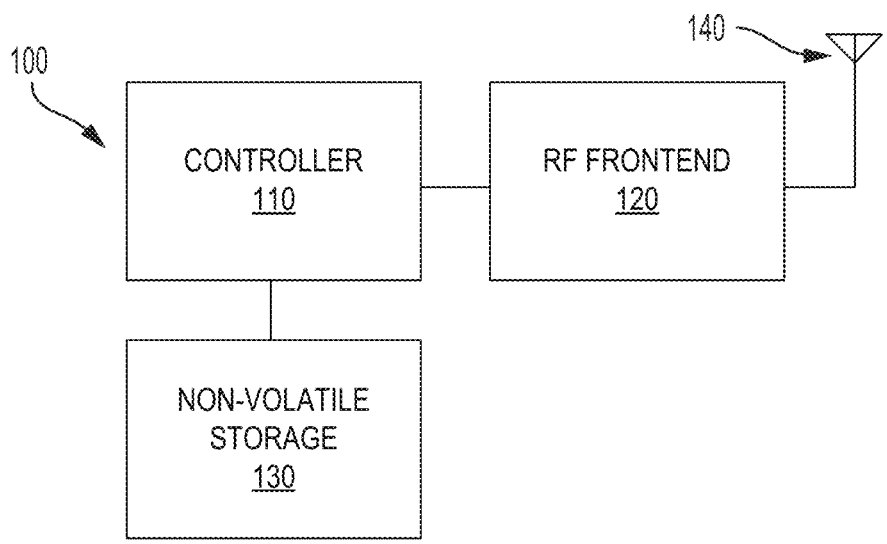
FIG. 1 is a schematic of elements of an example system.

FIG. 1 illustrates, via a schematic view, components of such a satellite or other space-based system 100. The system 100 includes an RF frontend 120 that is coupled to at least one antenna 140. The RF frontend includes clocks, phase-locked-loops (PLLs), modulators, demodulators, amplifiers, analog-to-digital converters (ADCs), digital-to-analog converters (DACs), attenuators, RF switches, pulse generators, pulse shapers, couplings, analog filters, circulators, directional couplers, limiters, blanking switches, or other components configured to transmit and/or receive RF signals according to an application (e.g., to transmit radar pulses and to receive return pulses). The RF frontend 120 is coupled to a controller 110 such that the controller 110 can operate the RF frontend 120 (e.g., ADC(s), DAC(s), RF switches, and/or other components of the RF frontend 120) to generate a high-bandwidth stream of samples of one or more signals. For example, the signals could be in-phase ("I") and quadrature ("Q") components of received radar returns pulses and/or received continuous-wave radar return signals. The controller 110 could then record the generated samples to a non-volatile storage medium 130 (e.g., a solid-state hard drive).

It can be difficult for such a system (e.g., system 100) to record, to a non-volatile storage medium, large amounts of high-bandwidth data (e.g., generated by the operation of the RF frontend 120) while remaining within the strict size, mass, cost, and power constraints of a satellite (e.g., cubesat, micro-satellite, or nano-satellite) or other space-based application. One solution to this problem is to reduce the overall cost and power requirements by writing the data to multiple multiplexed nonvolatile storage mediums (e.g., multiple solid-state hard drives). This can allow the per-medium data transfer bandwidth to be reduced, thus reducing the power used and reducing component cost.

To further reduce cost and size while providing sufficient flexibility for a range of applications, the RF frontend 120 may be simplified by inclusion of high-bandwidth ADCs and DACs. Accordingly, some signal processing tasks (e.g., modulation, pulse generation, pulse timing, envelope detection) may be performed efficiently, and in a reconfigurable manner, by being implemented digitally in a field-programmable gate array (FPGA) or other variety of programmable logic device (PLD) that forms part (or all) of the controller 110. Such a PLD may also be used to manage and transmit samples of data to multiple different non-volatile storage mediums. Such an RF frontend may also include one or more switches to facilitate self-test and calibration of the RF frontend, e.g., by generating a calibration pulse for each radar pulse transmitted by the RF frontend. Such a self-test and calibration functionality may increase the performance of the system while reducing cost by allowing the system to detect and compensate for changes in performance due to temperature changes or other internal or external factors.

II. Multiplexing Non-Volatile Storage for Increased Bandwidth and Reduced Power It can be desirable, in a variety of space-based applications, to record a significant amount (e.g., second, minutes, or hours) of high-bandwidth data to non-volatile storage for later use. For example, the power and/or heat dissipation budget could be insufficient to both generate the data and to process the data (e.g., to analyze the data, compress the data, encrypt the data, retransmit the data) at the same time. Additionally or alternatively, the local computational resources could be insufficient to both generate the data and to process the data at the same time. For example, there could be insufficient computational and/or memory access bandwidth to generate the data and to process the data. In some examples, some other local resource could be insufficient to perform both the data generation and data use tasks. For example, a reconfigurable, general-purpose RF frontend could be operated to transmit and receive radar pulses and to transmit and receive RF communications (e.g., to communicate radar data), but not to do both at the same time.

The generated high-bandwidth data could be baseband signal data generated by down-mixing or otherwise demodulating radar return signals, RF communications signals, radio astronomy signals, or some other high-bandwidth signal(s) of interest. The signals could be acquired at a high bandwidth in order to reduce the overall and/or instantaneous cost, in terms of power, heat dissipation, and/or some other factor, by allowing filtering, modulation/demodulation, or other processing tasks to be performed digitally (e.g., by a graphics processing unit (GPU), a tensor processing unit (TPU), or an FPGA or other PLD) instead of by analog RF blocks.

However, transferring large amounts of high-bandwidth data to a non-volatile storage medium can be associated with higher-cost components and/or increase power use owing to the corresponding high bandwidth needed for the serial bus or other interface with the non-volatile storage medium. In order to address this issue, the high-bandwidth data could be stored into multiple different multiplexed non-volatile storage mediums (e.g., multiple different solid-state hard drives). This allows each individual non-volatile storage medium and corresponding non-volatile storage interface (e.g., serial AT attachment (SATA) interface, non-volatile memory express (NVMe) interface) to operate at a lower bandwidth, allowing for an overall reduction in power use and/or component cost.

To further reduce the power used to store large amounts of such high-bandwidth data, an FPGA or other variety of PLD could be employed to receive samples of the signal (e.g., from a high-bandwidth ADC) and to manage transmission of the received samples to two or more multiplexed non-volatile storage mediums. The PLDs could additionally perform decimation, filtering, compression, buffering in a local memory (e.g., one or more dynamic random-access memory (DRAM) blocks of an FPGA, or one or more discrete DRAM ICs connected to the FPGA), or some other variety of processing on the samples prior to storing the samples on the non-volatile storage mediums. Such a PLD (e.g., an FPGA) could also perform other operations related to the generation of the high-bandwidth data, e.g., by operating a DAC or other elements of an RF frontend to generate radar transmit pulses or other transmitted radar waveforms, to operated switches of the RF frontend to configure the RF frontend and/or to route signals through the RF frontend (e.g., to select a level of amplification or decimation, to select a level of up-modulation or down-modulation, to direct alternating transmit pulses to an amplifier for transmission or directly to the receiver, via an internal signal path, to act as a calibration and/or self-test pulse).

The PLD could include a respective interface for each of the non-volatile mediums (i.e., the PLD could include an on-board multiplexer). The PLD could implement aspects of the physical layer (PHY), link layer, transport layer, and/or some other raspect(s) of the non-volatile storage interface (e.g., of a SATA interface). Additionally or alternatively, a multiplexer (e.g., a SATA multiplexer integrated circuit) that is separate from the PLD could be operated by the PLD to direct data from the PLD to the different non-volatile storage mediums via respective non-volatile storage interfaces. Such a multiplexer could also provide controllable access to the non-volatile storage interfaces to other computing devices, e.g., general-purpose processors, GPUs, TPUs, FPGAs, PLDs, or other computing devices. Such multiple different types of processor could be provided in order to facilitate selection of the most power-efficient processor type for a particular computation or other process related to the data stored on the non-volatile storage mediums. For example, a GPU could be connected, via a multiplexer or demultiplexer, to one or more non-volatile storage mediums in order to perform processing on the data stored in the storage mediums. Such processing could include many parallel processes (e.g., filtering, convolution, template matching) that take advantage of hardware multipliers, accumulators, or other elements found in a GPU. In another example, an FPGA could be connected to the one or more non-volatile storage mediums in order to filter, decimate, modulate, mix, compress, encrypt, or apply some other signal processing processes to the stored data to facilitate transmission of the stored data (e.g., via the RF frontend used to generate the data) to some remote system (e.g., to a receiver located at a ground facility).

Figure 2:
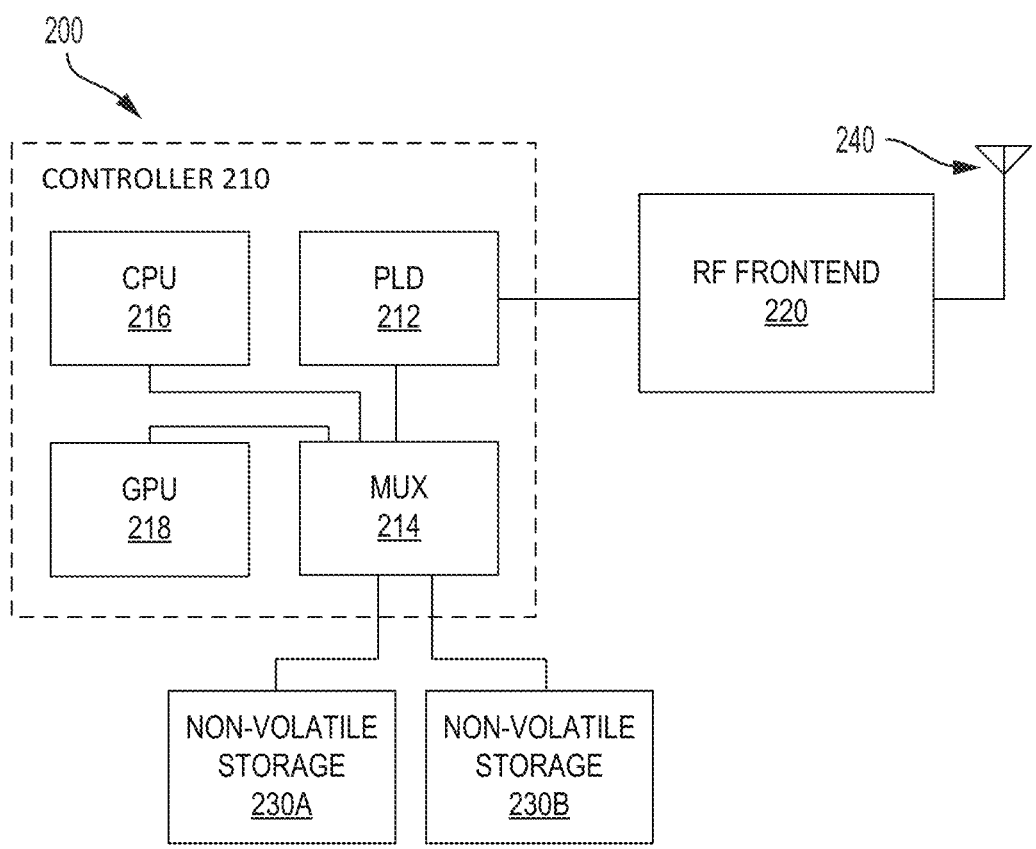
FIG. 2 is a schematic of elements of an example system.

FIG. 2 illustrates an example system 200 according to the embodiments discussed above. The system 200 includes an RF frontend 220 that is coupled to an antenna 240 and that is configured to facilitate generation of high-bandwidth signals related, e.g., to demodulated RF signals received using the RF frontend 220. Such signals could be the down-mixed or otherwise demodulated return pulses from a pulse-based radar, signals related to radio astronomy, or some other RF signals. A controller 210 includes a PLD 212 (e.g., an FPGA) that is coupled to the RF frontend 220 (e.g., to one or more ADCs, DACs, RF switches, or other elements of the RF frontend 220) in order to receive high-bandwidth samples of a demodulated RF signal. The PLD 212 is also coupled to first 230A and second 230B non-volatile storage mediums (e.g., solid-state hard drives) via a multiplexer ("MUX") 214 such that the PLD 212 can record a first set of samples of the demodulated RF signal in the first non-volatile storage medium 230A and a second set of samples of the demodulated RF signal in the second non-volatile storage medium 230B. The controller 210 also includes a CPU 216, a GPU 218, and other processing elements (not shown) that may access the non-volatile storage mediums 230A, 230B via the multiplexer 214 in order to process data stored therein.

Samples of one or more high-bandwidth demodulated RF signals generated from an RF frontend may be distributed between two (or more) non-volatile storage mediums in a variety of ways. In examples where two signals are being sampled, samples corresponding to the two different signals could be recording in respective different non-volatile storage mediums. For example, the RF frontend could generate first and second signals related to the in-phase ("I") and quadrature ("Q") components of a received radar return pulse. Samples of the first "I" signal could be recorded to a first non-volatile storage medium and samples of the second "Q" signal could be recorded to a second non-volatile storage medium. In another example, alternating samples of the signal(s) could be recorded to respective different non-volatile storage mediums. For example, first, third, fifth, etc. samples ("odd" samples) of a signal could be recorded to a first non-volatile storage medium while second, fourth, sixth, etc. samples ("even" samples) of the signal could be recorded to a second non-volatile storage medium. In yet another example, segments of the signal(s) could be divided in some manner. For example, the signal(s) could represent a plurality of radar pulses generated sequentially over time. In such an example, samples related to certain segments (e.g., segments related to odd radar pulses) could be recorded to a first non-volatile storage medium while samples related to other segments (e.g., segments related to even radar pulses) could be recorded to a second non-volatile storage medium.

Note that a system as described herein may include separate multiplexers and demultiplexers to facilitate record and/or retrieval access to multiple non-volatile storage mediums. Such multiplexers and/or demultiplexers may include one or more discrete components (e.g., a SATA multiplexer IC). Additionally or alternatively, some or all of such multiplexer and/or demultiplexers functionality may be incorporated into an FPGA, a PLD (e.g., PLD 212), or some other element(s) of the system.

Further, a system as described herein may include more than two non-volatile storage mediums to which respective different sets of samples of one or more high-bandwidth demodulated signals may be recorded. For example, a system may include three, four, or more non-volatile storage mediums.

III. An Example RF Frontend

An RF frontend as described herein may include a variety of components configured to facilitate one or more applications. Such applications can include radar (e.g., continuous wave or pulsed radar, monostatic radar, synthetic aperture radar), RF communications, radio astronomy, scientific investigation of the RF and/or magnetic behavior of the Earth or of some other body of interest, detecting information about weather, or some other scientific or industrial application. Commercial products to satisfy these applications are often ill-suited to space applications, especially to the strict size, weight, power, and cost limitations of the Cubesat form factor or of other micro- or nano-satellite form factors. These commercial solutions often include a broad set of features which may all contribute to the cost, weight, volume, and power requirements of the solution but which may provide functionality which is of no or little use to a particular application.

To address these concerns, an RF frontend as described herein may include high-bandwidth ADCs and/or DACs to facilitate the performance of a variety of signal processing tasks digitally (e.g., by an FPGA), so as to reduce the number of analog components or elements incorporated into the RF frontend. For example, a transmit path of the RF frontend could include a high-bandwidth DAC, one or more mixers or other modulators, and one or more amplifiers in order to transmit RF signals via one or more antennas. Such an RF frontend could also include one or more preamps, one or more mixers or other demodulators, and a high-bandwidth ADC to receive RF signals from the one or more antennas. By reducing the number of RF functions that are performed by analog hardware, the cost and power requirements of the RF frontend can be reduced.

Additionally, the flexibility and reconfigurability of the overall system is increased, as the FPGA or other PLD coupled to the RF frontend can be configured to perform a variety of signal processing tasks (modulation, demodulation, mixing, decimation, filtering, compression, decompression, encryption, decryption, run-length coding) digitally. The cost and power use of the overall system can be easily scaled to a particular application by employing the same RF frontend while reducing the capabilities of the PLD. For example, an FPGA with fewer gates or a lower maximum clock speed could be employed in less complex applications. In another example, an application-specific integrated circuit (ASIC) or a one-time-programmable PLD could be used where the system is only going to perform a single RF function or a few limited RF functions.

Such an RF frontend may additional include one or more RF switches to allow for some reconfiguration of the RF frontend. This could include switching between different amplifiers, attenuators, mixers/modulators, or other RF blocks. Such RF switches could be used to implement a self-test and/or calibration function by directing the output of a component of a transmit path of the RF frontend (e.g., the output of a modulator or amplifier) to be directed, via an internal signal pathway, to a component of a receive path of the RF frontend (e.g., to a demodulator). This switching could allow the functionality of the RF frontend to be tested and/or quantified while in use in order to verify the operational status of components of the RF frontend, to compensate for changes in the phase, frequency, amplitude, or other electrical properties of the RF frontend (due, e.g., to changes in temperature, aging and/or outgassing of components, or other internal or external factors), or to provide some other benefit.

In some examples, the RF switches used could configured to allow for very high-frequency operation (e.g., to switch at frequencies greater than 600 Hz). In such examples, such high-frequency switching could allow a calibration pulse to be generated for each radar pulse emitted from the RF frontend. That is, the switch could operate to direct a transmit pulse, from a modulator or other component of a transmit path of the RF frontend, to an antenna (e.g., via one or more amplifiers). The switch could then, prior to directing another transmit pulse to the antenna, direct a calibration transmit pulse from the transmit path to a receive path of the RF frontend (e.g., to a demodulator). Providing a calibration pulse for each of the transmitted radar pulses could allow the transmitted radar pulses to be continuously adjusted, could improve processing and analysis of the received return radar pulses, or could provide some other improved operation to compensate for pulse-to-pulse variability of the RF frontend. Such per-pulse calibration data may also allow for simplification of processing of the received pulse data, e.g., by allowing certain time-varying properties of the RF frontend to be determined directly from the calibration pulse data rather than by inferring such time-varying properties from the set of return pulse data. This operation may decrease the cost of and/or power used by the RF frontend by fully or partially obviating the need for temperature control or other environmental or electrical control or conditioning of the RF frontend.

Such RF switches can be configured to provide high frequency switching (e.g., greater than 600 Hz switching) of high-voltage RF signals (e.g., tens or hundreds of volts) while also avoiding latch-up, which may occur due to high-voltage transients, cosmic rays or other effects of the space environment, or due to other factors. To provide this performance, the RF switches may include silicon-on-insulator switches. For example, the RF switches may include silicon-on-sapphire switches.

A variety of different topologies of RF frontend may be applied to switch the output of a transmitter of the RF frontend (i.e., at least one DAC and at least one up-mixer or other modulator component of the RF frontend) between a signal path that results in transmission via one or more antennas (e.g., toward an amplifier of the RF frontend) and a signal path that leads to a receiver of the RF frontend (e.g., at least on ADC and at least one down-mixer or other demodulator component of the RF frontend). More than one switch may be provided in order to allow the output of the transmitter at multiple locations (e.g., the output of a modulator, the output of one or more amplifiers) to be selectively directed toward an antenna or toward a receiver of the RF frontend.

In some examples, the output of the switch may be directed toward the receiver via an additional switch. Such an additional switch could be operated to select the output of the first switch in order to direct calibration and/or self-test pulses from the transmitter to the receiver or to direct received radar return pulses or other RF signals from an antenna (e.g., from an amplifier coupled to the antenna) to the receiver. Additionally or alternatively, the output of a switch could be coupled to the receiver by some other means, e.g., by a circulator, a directional coupler, or some other active or passive RF coupling.

Figure 3:
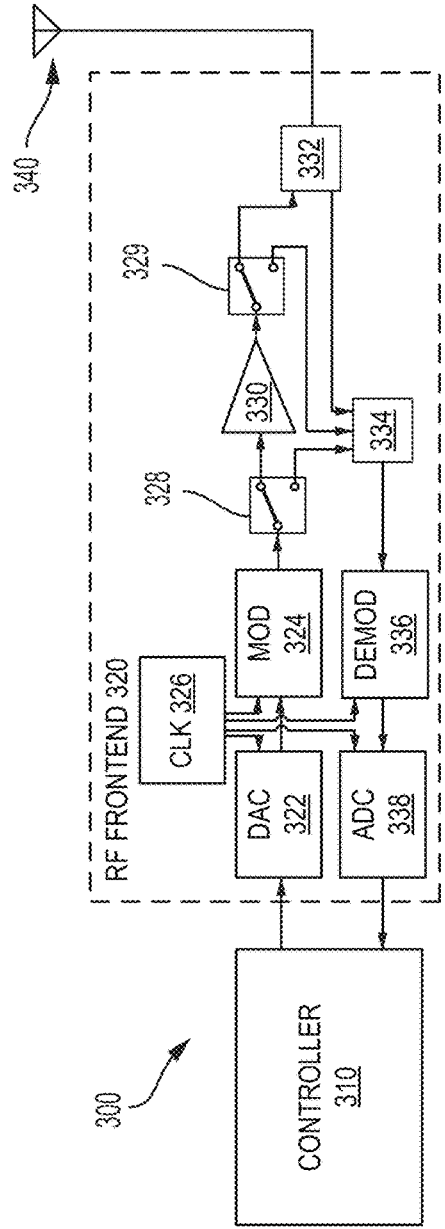
FIG. 3 is a schematic of elements of an example system.

FIG. 3 shows an example system 300 that includes an RF frontend 320 coupled to an antenna 340 (e.g., via an antenna port (not shown)) and to a controller 310 (e.g., to an FPGA or other type of PLD of the controller 310). The RF frontend 320 includes a transmitter that includes at least a DAC 322 that is coupled to the controller 310 and to a modulator ("MOD") 324 (e.g., a mixer and one or more filters). The RF frontend 320 additionally includes a receiver that includes at least an ADC 338 that is coupled to the controller 310 and to a demodulator ("DEMOD") 336 (e.g., a mixer and one or more filters). The ADC 338, DAC 322, modulator 324, and demodulator 336 are fed by a common reference clock ("CLK") 326. The modulator 324 and/or demodulator 336 could include a local oscillator that is located on the same integrated circuit as the modulator 324 and/or demodulator 336. Such a local oscillator could include a phase-locked loop that is fed by the reference clock 326. To improve the performance of the system, the local oscillator from the modulator 324 could be output directly to feed the demodulator 336 (not shown).

The DAC and/or ADC could be single-channel or multiple channel devices. For example, the DAC and ADC could both be dual-channel devices, with a first channel of each corresponding to an in-phase signal ("I") and a second channel of each corresponding to a quadrature signal ("Q"). The DAC could include digital interpolators or other digital or analog components. The ADC could include digital decimators or other digital or analog components.

The output of the modulator 324 is fed to a first switch 328 that is operable to direct the output of the modulator 324 to either the antenna 340 (via an amplifier 330, a second switch 329, and a first coupling 332) or to the demodulator 336 (via a second coupling 334). The output of the amplifier 330 is fed to a second switch 329 that is operable to direct the output of the amplifier 330 to either the antenna 340 (via the first coupling 332) or to the demodulator 336 (via the second coupling 334). Thus, calibration signals may be measured from multiple stages within the RF frontend 320 (either of the output of the modulator 328 or the output of the amplifier 330). Either of the first coupling 332 or the second coupling 334 could include RF blanking switches, some other variety of RF switch (e.g., a silicon-on-insulator switch) or some other means for actively directing RF signals between components of the RF frontend 320. Additionally or alternatively, the couplings 332, 334 could include passive components and/or mixed active/passive elements. For example, the first coupling 332 could include a circulator configured to direct signals from the second switch 329 to the antenna 340 and from the antenna 340 to the second coupling 334. In another example, the first coupling 332 could include a diplexer. In some examples, the second coupling 334 could include a directional coupling. Attenuators and/or signal limiters could be included in one or more of the illustrated signal paths, e.g., to protect the RF frontend 320 from damage and/or to provide some other benefit.

Figure 4:
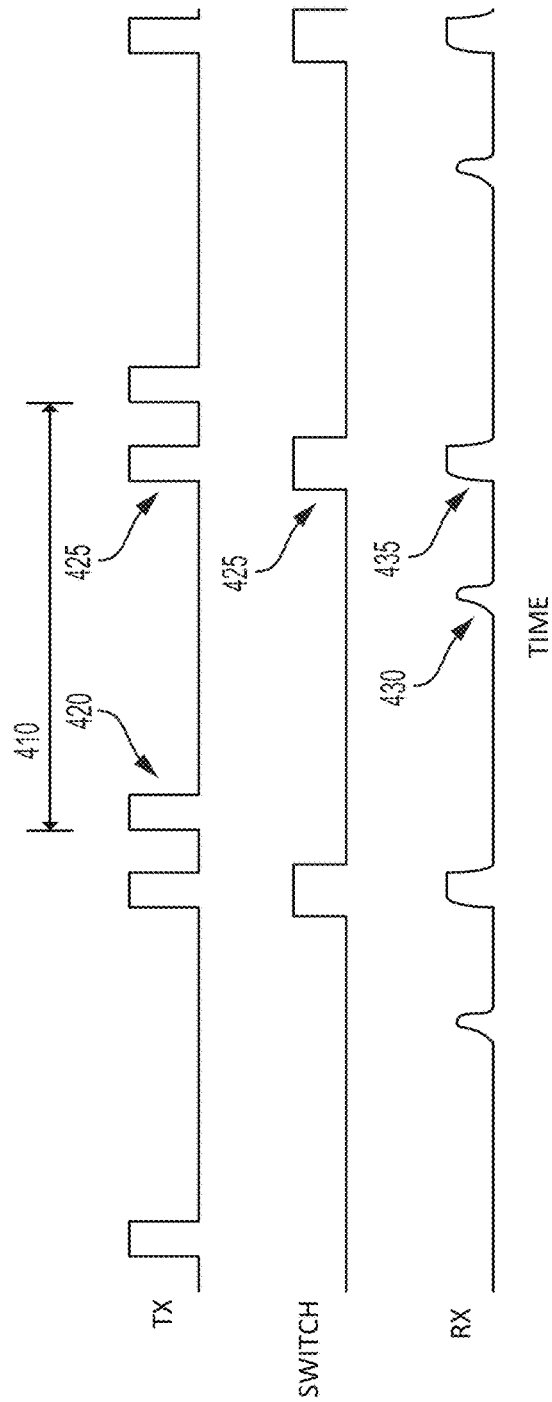
FIG. 4 is a timing diagram of signals generated and received by an example system.

FIG. 4 is an example timing diagram of operation of the system 300 of FIG. 3. The timing diagram shows three time segments including a particular time segment 410. During the particular time segment 410, a transmitter (output shown as "TX") emits a radar transmit pulse 420 and a calibration pulse 425 (e.g., a self-test pulse). A switch is operable to direct the output of the transmitter to an antenna (e.g., via one or more amplifiers, circulators, diplexers, antenna ports, additional switches, filters, etc.) or to a receiver (e.g., via one or more directional couplings, attenuators, additional switches, filters, etc.). The operation of the switch (shown as "SWITCH") directs the transmitter output to the receiver during a calibration period 425 or to the antenna otherwise. As a result, the signal generated by the receiver (shown as "RX") includes a calibration pulse 435 (due to the switch directing the calibration pulse 425 output of the transmitter to the receiver via an internal signal path) and a radar return pulse 430 due to receiving, via one or more antennas, a pulse of RF energy from a target in response to emitting the radar transmit pulse 420 via one or more antennas.

Information (e.g., a phase, an amplitude, a frequency, a waveform shape) about the received calibration pulse 435 could be used to determine that the RF frontend is operational, to determine a phase shift or other electrical properties of the RF frontend, to adjust one or more properties of transmit pulses subsequently generated by the transmitter, or to perform some other operation. In some examples, information about the received calibration pulse 435 could be used to analyze the received radar return pulse 430, e.g., to improve the accuracy with which a distance to a target or some other information of interest is determined based on the radar return pulse 430.

As shown in FIG. 4, a single calibration pulse is generated (and routed to the receiver) for each transmitted radar pulse. However, other methods of operation are possible. For example, a single calibration pulse could be generated for a set (e.g., five or more, ten or more) of transmitted radar pulses. Additionally or alternatively, multiple types of calibration pulses could be generated. For example, a first calibration pulse could be generated by directing a single from the output of a modulator of the transmitter to the receiver and a second calibration pulse could be generated by directing a single from the output of another component (e.g., an amplifier) of the transmitter to the receiver (e.g., via an attenuator).

IV. Example Cubesat Embodiments

A Cubesat is a particular variety of nano-satellite having a standardized system bus and physical size and weight characteristics. Individual Cubesats are designed to fit within a set number and arrangement of 10-centimeter cubes during launch and initial deployment. For example, a 1 U Cubesat fits within a 10-centimeter cube, a 2 U Cubesat fits within a 10-by-10-by-20 centimeter volume (i.e., two 10-centimeter cubes stacked together), a 3 U Cubesat fits within a 10-by-10-by-30 centimeter volume (i.e., three 10-centimeter cubes stacked together), etc. Cubesats are designed to be cheaply and easily designed and launched by replacing the ballast mass that would otherwise be wasted when launching other payloads.

Microsatellite-compatible RF systems to-date have been low-performance and are often custom designed for specific applications (such as narrowband data download). The disclosed architecture is high-performance and highly flexible, capable of supporting multiple, diverse missions (such as broadband communications and RF signal collection).

The module performs the complete radar function; including timing, receiver and transmitter exciter. Measurements are made with confidence because of the built-in-test (BIT) capability. The compact size makes the insertion into an existing satellite or UAV less intrusive.

The architecture leverages recent advances in a number of different components and combines them in an innovative ways to greatly reduce the processing unit's form factor and power consumptions. Major innovations of this design include: 1) use of new generation commercial off-the-shelf (COTS) components that achieve high capacity and power-efficient processing, with an upgrade path to take advantage of future components and technologies. 2) A layered processing approach with the ability to select the best computing resource for any application. The processing modes include an advanced field-programmable gate array (FPGA) for high rate/low latency bit level processing, an embedded central processing unit (CPU) for higher level software-based real-time processing, and a computer-on-module (CoM) CPU/GPU processor for heavy duty floating point processing. 3) Solid state drives (SSDs) using high-speed Serial advanced technology attachment (SATA) bus interfaces for deep long-term storage at the rates needed for high bandwidth signals. 4) Parallelized storage that doubles throughput by writing I/Q samples to separate SSDs.

The disclosed architecture leads to a robust, compact processing solution that addresses the requirements of a variety of current and future missions. It provides critical advantages in power, weight, bandwidth, and latency and delivers superior mission support for collection, electronic warfare, and advanced sensing (e.g., SAR). It incorporates low-cost COTS components and open-source software/firmware, and is, therefore, very cost-effective.

By implementing a SATA Host Controller on the same FPGA used to collect the digital data (e.g., from an ADC or a CMOS/CCD detector) the disclosed architecture is able to directly write that data to non-volatile SSD drives. This removes the need for any intermediate bridge/buffer components, which in turn: 1) reduces the complexity of the system, 2) leads to a more compact, power-efficient, and cost-effective solution. It is especially relevant to satellite missions requiring on-orbit collection and storage of high-bandwidth RF data. However, it is also well-suited for other applications where form factor and power consumption are key concerns, e.g. UAV/AUV applications.

Some of the disclosed architectures use an I/Q modulator and I/Q Demodulator to generate transmit pulses and process receive signals in the 2.5 GHz to 3.5 GHz band. A single local oscillator is used to drive the modulator and demodulator devices. A highly-integrated, dual ADC and DAC chip is utilized to perform the analog to digital interface. The chip also is capable of data decimation from the ADC and incorporates a data interpolator interface to the DAC.

Onboard switching provides signal routing to perform on-the-fly calibrations. This capability offers the user the ability to compensate for slight changes in component performance due to environmental conditions. It also validates data acquisition by establishing a high-confidence in system readiness.

Some of the disclosed architectures use highly-integrated RF ICs combined onto a multi-layer printed circuit board. These devices offer state-of-the-art performance while consuming little power in a compact volume. The approach also includes automatic calibration capability to compensate for operational and environmental variations.

An example TX/RX module includes all of the low-level radar electronics needed to transmit, amplify, and demodulate receive signals. The TX/RX module takes in the 12 bits of I and Q transmit waveform generated by the High Speed TX/RX Processor module to drive a dual digital-to-analog converter (DAC). The analog outputs of the DAC are filtered and passed to a quadrature modulator. Using a local oscillator (LO), the baseband modulation is upconverted directly to the 3.2 GHz operating frequency. This low-level output is filtered and amplified to a level sufficient to drive the PA module. The direct-conversion (or homodyne) technique eliminates the need for complex filtering and multiple intermediate frequency stages, reducing the parts count and high data rates associated with direct RF sampling, and improving the overall reliability of the circuit.

For the receive path, a signal enters the TX/RX board via the isolated port on the Circulator module. A diode limiter clamps any large pulses that might make their way from the Circulator. Next, the signal enters a high speed, solid-state blanker switch, constructed using "silicon on sapphire" technology that can handle large input signals and is immune to latchups. The blanker switch provides 50 dB of isolation in transmit mode to further isolate the sensitive receive path from any transmitter pulse leak-through. Following the blanker switch is a cascade of low-noise gain, filtering, and adjustable attenuation to further process the return signal. The amplified 3.2-GHz signal is presented to the input of an I/Q demodulator, where more gain and low-pass filtering are applied. Conversion to I and Q baseband is accomplished with the same 3.2 GHz (LO) used in the up-conversion process. A dual, matched analog-to-digital converter (ADC) digitizes I and Q and passes 12-bit data onto the High Speed TX/RX Processor module.

FIGS. 5A through 5D show schematics of example TX/RX modules. The three main modules are power amplifier module, TX/RX module, and highspeed TX/RX processor module. In past configurations the Circulator Module was a stand-alone module but now has been integrated into the Power Amplifier Module enabling more margin for volume. The T/Q modulator device can be a TT-TRF3720 17 and the driver amplifier is from Skyworks. For the Rx path, the I/Q demodulator device selected is TT-RF371125. The LNA is Skyworks 67151, and the limiter device is Aeroflex-Metelics. Built-in-test (BIT) capability was tested where calibration paths and levels were analyzed.

The disclosed designs have several beneficial attributes: 1) deep non-volatile storage with high dynamic range: available SDRs can only capture short bursts of high rate data, but the disclosed solutions can provide 1.5 hour-long recording capabilities for the full 200 MHz at full dynamic range (~72 dB). This capability enables missions that might desire human-in-the-loop processing without being constrained by the typically short lengths or "snapshots" that most systems support. Other supported missions are those involving on-board processing that might utilize data across many passes and need to store them each in their raw form. 2) Low-latency processing: SDR systems available today typically use an Ethernet like link from the FPGA to the higher level compute resource. This link limits the reaction time, and the real time performance that the system can provide. When real time systems are implemented, they are highly buffered (if the solution allows) or implemented in the FPGA (if the processing capacity exists). A tightly coupled FPGA/CPU architecture allows the CPU to be processing samples at the 10 µs scale of delay after the ADC. 3) High performance, power-efficient computing: the novel, layered processing approach of the disclosed architectures enables the optimal balance of FPGA/GPU/CPU computing resources in one compact power-efficient package, providing the best of low latency/integer oriented processing (FPGA), higher level language programming (CPU) and heavy duty floating point processing (GPU), and the ability to choose the best resource for any application. 4) Adaptable: the disclosed architectures can provide a simple upgrade pathway to take advantage of new generation COTS components, such as higher-capacity mSATA hard drives, faster and more power-efficient CPUs and GPUs (e.g., newer SoC's), and improved RF power amplifiers.

Use of new generation commercial off-the-shelf (COTS) components that achieve high capacity and power-efficient processing, with an upgrade path to take advantage of future components and technologies.

A layered processing approach with the ability to select the best computing resource for any application. The processing modes include an advanced field-programmable gate array (FPGA) for high rate/low latency bit level processing, an embedded central processing unit (CPU) for higher level software-based real-time processing, and a computer-on-module (CoM) CPU/GPU processor for heavy duty floating point processing.

Solid state drives (SSDs) using high-speed Serial advanced technology attachment (SATA) bus interfaces for deep long-term storage at the rates needed for high bandwidth signals.

Parallelized storage that doubles throughput by writing I/Q samples to separate SSDs.

The combination of these design features forms a robust, compact processing solution that addresses the requirements of a variety of current and future missions. Example embodiments disclosed herein have been developed into a single-channel benchtop prototype, part of a CubeSat synthetic aperture radar (SAR) system Comparison with State-of-the-Art Alternatives—Existing microsatellite RF systems are low-performance and custom-designed for specific applications. The designs disclosed herein incorporate parallelized native SATA interfaces and tightly-coupled FPGA and CPU resources, bypassing the signal capture and processing bottlenecks in existing SDRs. These systems are broadband, reaching beyond the 6 GHz upper limit of many other systems. The design further surpasses the frequency agility of existing systems by multiplexing multiple RF front ends to support the entire tunable range of the radio.

In summary, these designs provide critical advantages in power, weight, latency, and transceiver bandwidth, and delivers superior mission support for collection, electronic warfare, and advanced sensing (e.g., SAR).

The combined hardware/software systems disclosed herein will provide a microsatellite-compatible, high-performance RF processing unit (RFPU) that functions as a flexible SDR with the computational capacity and real-time data storage elements needed to support a diverse set of communications and sensing missions. These designs will make use of new generation COTS components in an innovative way that enables unprecedented, high-capacity and power-efficient processing.

These designs have been physically embodied in a benchtop prototype of a CubeSat-compatible SAR subsystem with many of the same performance requirements as the pathfinder and prototype units desired under this program.

The leading performance challenges are to support high-bandwidth transmit/receive (TX/RX) operations (>100 MHz for the pathfinder, >200 MHz for the prototype), advanced high-throughput computational capacity (>100 operations per digital sample), and non-volatile storage capabilities in a real-time, low-power environment. The designs disclosed herein meet these challenges with a clever COTS-based solution that combines 1) high-speed, high-bandwidth Texas Instruments (TI) analog-to-digital and digital-to-analog converters with a space-capable Zynq FPGA featuring dual-core ARM A9 processors; 2) a Tegra X1 processor to provide powerful data processing; and 3) SATA interface to two 2-TB solid state drives.

SDRs achieve adaptive communications by implementing many of the basic radio system functions in software rather than hardware. SDRs are well suited for satellite communications systems because they can be reprogrammed on orbit to accommodate changes in modulation protocols, modulation rates, data formats, and waveform design. They are increasingly recognized for their utility in a variety of situations. For example, the compact and power-efficient nature of the SDR lends itself well to microsatellite operations. Several microsatellite-compatible SDR solutions are commercially available in modular packages that offer communications over a variety of frequencies (e.g., TUI SWIFT radios for CubeSats, Vulcan Wireless). However, existing microsatellite-compatible SDR technologies make significant compromises between flexibility, cost, and performance.

FIG. 6 summarizes the estimated performance for our approach and shows that this solution will meet or exceed all performance goals for the prototype system.

Software Defined Radio: Agile High-bandwidth Transmit/Receive Capability. The disclosed SDR solution for the microsatellite/nanosatellite platform markedly overcomes the performance deficits of existing solutions without sacrificing other desirable qualities such as size, cost, flexibility, and power-efficiency. This approach is to leverage advances in a number of different COTS technologies and employ innovative system-level design expertise to package them together. The end result is a high-end SDR that has a tiny form-factor and very low power consumption compared to alternative designs.

Figures 1, 5A:
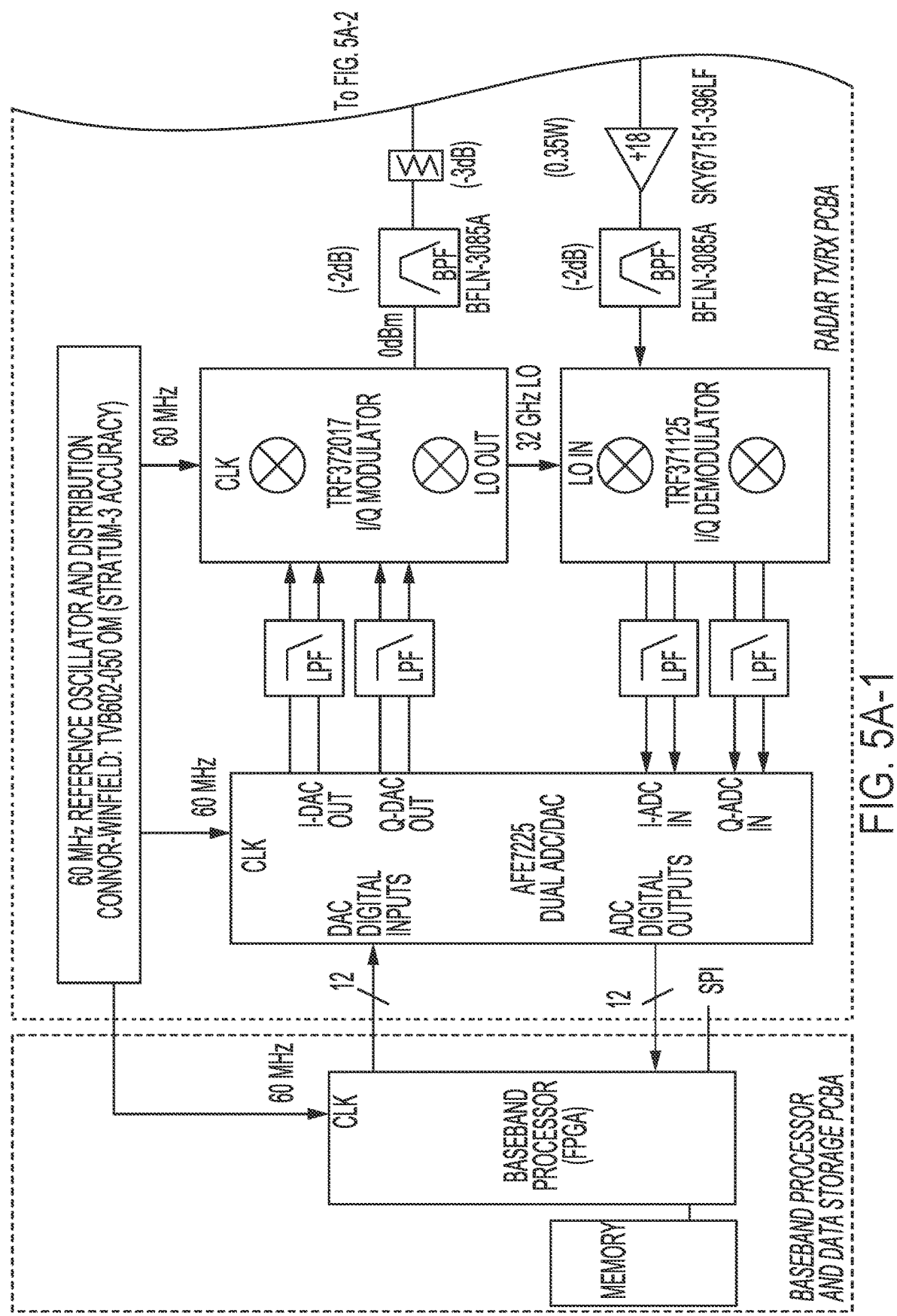
Figures 2, 5A:
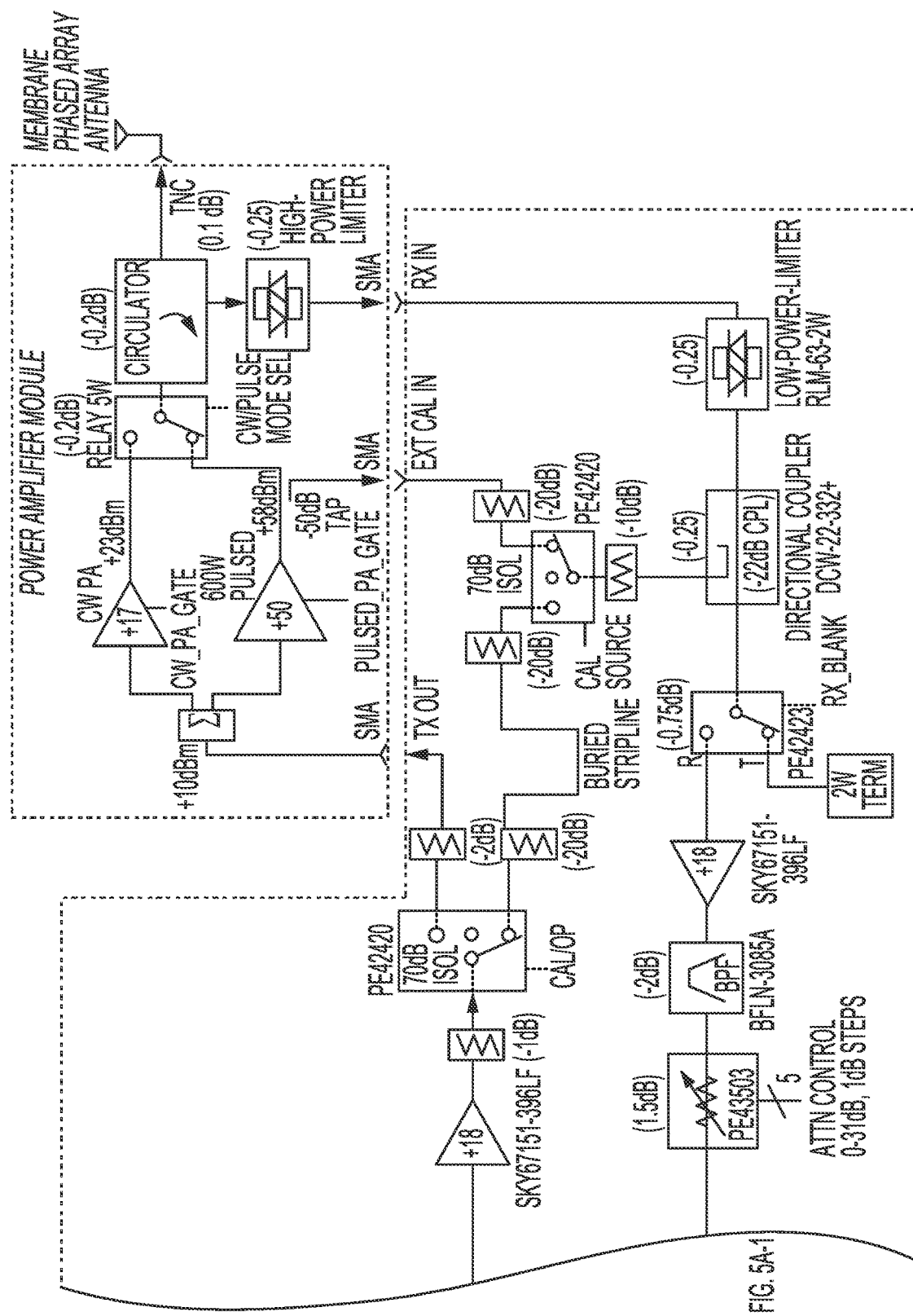
Figures 1, 5B:
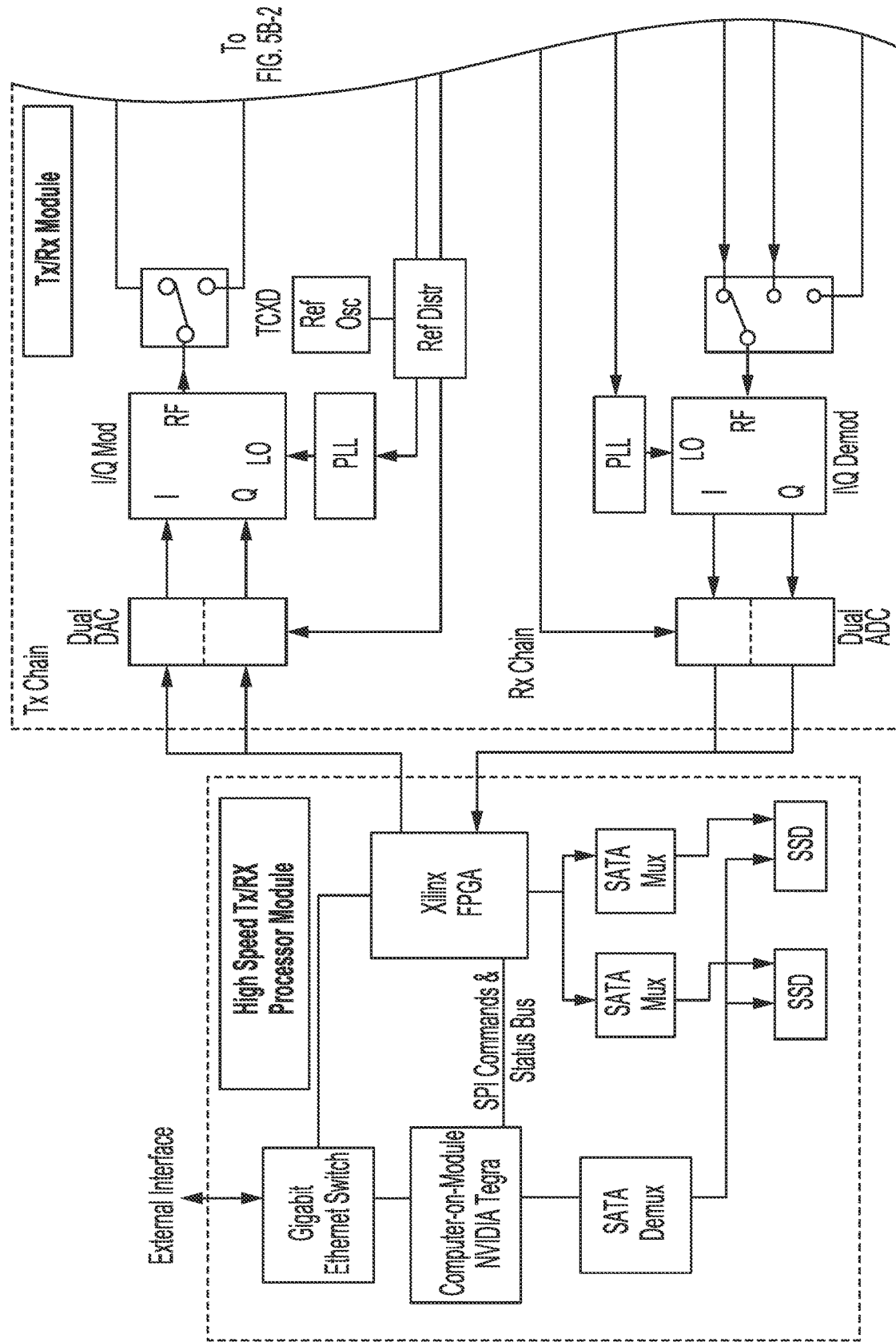
Figures 2, 5B:
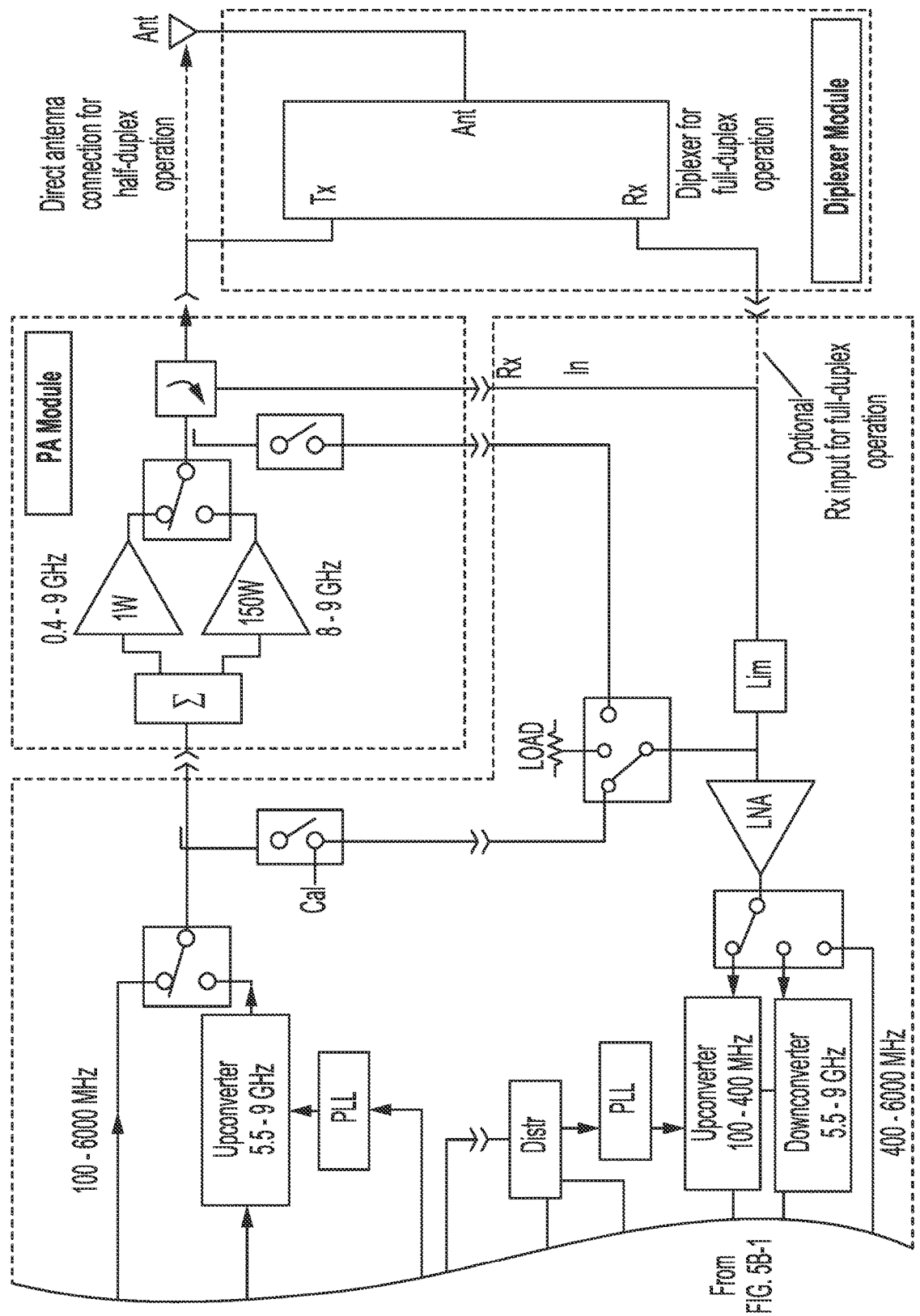

The disclosed embodiments are designed to cover a wide range of frequencies (100 MHz to 9 GHz) for increased mission versatility. These designs exceed the pathfinder/prototype performance goal of operating at frequencies higher than 2/4 GHz while still supporting standard military SATCOM waveforms that occur below 400 MHz. The upper end of the supported frequency range is higher than most existing SDRs, which typically top off around 6 GHz, for extended mission capabilities like high-resolution synthetic aperture radar (SAR) or high-rate communications. Unlike most commercially available SDR's, the designs disclosed herein support broad frequency agility, even at the RF front end, by incorporating multiple power amplifiers that are selected with a software-controlled switch. The disclosed design can switch between a low-power (~1 W) wideband continuous-transmission amplifier, appropriate for ground-based demonstration, and a higher power (~150 W) more band-limited (8-9 GHz) pulsed amplifier, appropriate for on-orbit operation. The power amplifier (PA) module can be rapidly changed on the bench to support different sub-bands and different amplification requirements. FIGS. 5B-1 and 5B-2 show the entire RF processing unit design, including the RF front end subsystem needed to demonstrate the RFPU in a representative environment The TX/RX module includes all of the low-level RF electronics needed to transmit, amplify, and demodulate receive signals. For the transmit path, the TX/RX module takes in 16 bits each of I and Q waveform generated by the High-Speed TX/RX Processor module to drive a dual digital-to-analog converter (DAC). A dual-channel 16-bit 800 MS/s DAC part from TI (TI-DAC5688) has been selected to support the instantaneous RF bandwidth >200 MHz prototype performance goal. The analog outputs of the DAC are filtered and passed to a quadrature modulator (e.g., HMC1097), which uses a local oscillator (LO) to directly upconvert the baseband signal to an RF operating frequency in the 100 MHz to 6 GHz range.

A separate IF to RF translation stage is used to extend coverage above 6 GHz. The frequency mode switches (100 MHz-6 GHz, vs. 5.5 GHz-9 GHz) are controlled by software, as are all other switches in the diagram. The direct-conversion (or homodyne) technique combined with a single heterodyning stage eliminates the need for complex filtering and multiple intermediate frequency stages, reducing the parts count and high data rates associated with direct RF sampling, and improving the overall reliability of the circuit. This direct-to-analog stage also exploits modern I/Q modulators and maximizes frequency flexibility because no frequency-specific image reject filter is required. After the upconversion, the low-level RF output is filtered and amplified to a level sufficient to drive the PA module. The output of the PA module is connected to an antenna via either an isolating circulator (half-duplex mode) or via an external frequency selective diplexer (full-duplex mode).

The RF front end supports both full-duplex and half-duplex operation. Full-duplex operation over separate frequencies is supported by separate phase-locked loops on the transmit and receive boards. The frequency-selective diplexer isolates high transmit power at frequency A from received power at frequency B. In half-duplex operation, the system alternates between transmitting and receiving, and an RF circulator provides the necessary isolation (~25 dB) to protect the receiver from high transmit power.

For the receive path, a signal enters the TX/RX board from the antenna via either the isolated port on the circulator or via the frequency-selective diplexer. Next, the signal enters a high-speed, solid-state blanker switch constructed using silicon-on-sapphire technology that can handle large input signals and is immune to latchups. The blanker switch provides 50 dB of isolation in transmit mode to further isolate the sensitive receive path from any transmitter pulse leak-through. Following the blanker switch is a cascade of low-noise gain, filtering, and adjustable attenuation to further process the return signal. The amplified RF signal is presented to the input of an I/Q demodulator (e.g., ADL-5380), where more gain and low-pass filtering are applied. Direct conversion to I and Q baseband is accomplished with the demodulator LO for operating frequencies in the 400 MHz to 6 GHz range; two separate RF to IF translation stages extend coverage above 6 GHz and below 400 MHz, respectively. Simple low-pass filters operate on the baseband signals to reject out-of-band interference. A dual, matched analog-to-digital converter (ADC) digitizes I and Q and passes 14-bit data onto the High-Speed TX/RX Processor module. We have selected a two-channel 14-bit 250 MS/S ADC part (TI-ADS42B49) to support the instantaneous RF bandwidth >200 MHz prototype performance goal. The 14-bit digitizer combined with the 3.5 dB noise figure of the low-noise amplifier yields an estimated usable signal dynamic range near 72 dB. These components thus provide sufficient dynamic range for higher-order time-domain modulations and also high peaking factor variants such as orthogonal frequency division multiplexing (OFDM).

Computational Capacity: Real-time, Power-efficient, and High-Performing. The disclosed embodiments overcome the limitations of current RF processing approaches by providing a layered processing capability: (1) an FPGA provides the high rate/low latency bit level processing; (2) an embedded CPU processor core supports software-based real-time processing to augment the FPGA; and (3) a computer-on-module (CoM) CPU/GPU processor exchanges higher latency and lower data transfer rates for very high computational capabilities in high-level languages. This flexible processing package is further enhanced with deep, long-term storage via solid state drives (SSDs) that are accessed using high-speed SATA bus interfaces. The combination of these assets forms a robust and compact processing solution that efficiently addresses the requirements of a multitude of missions.

Figure 5C:
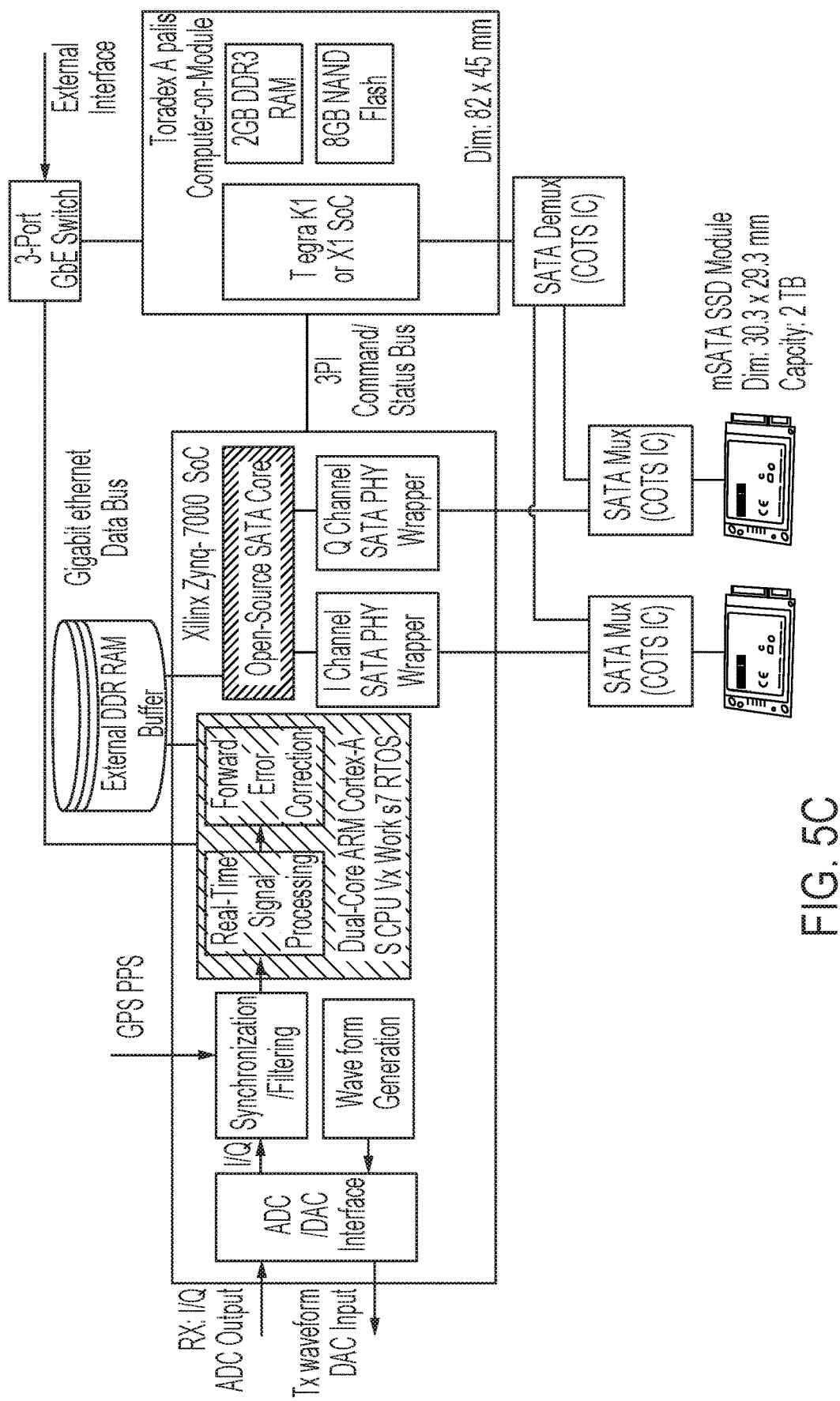
FIG. 5C is a schematic of an example controller.

FIG. 5C summarizes an example architecture. At the core of the High-Speed TX/RX Processor module is the Xilinx Zynq-7000, an integrated FPGA/CPU system on chip (SoC) chosen for its low power consumption, SATA-compatible on-chip transceivers, and high-performing embedded processors. The Zynq SoC combines dual-core ARM Cortex-A9 processors and flexible 28 nm programmable logic on a single device to enable a low-cost, low-power, compact approach to real-time processing.

The Zynq FPGA stage performs the following key functions: (1) interfaces with the ADC/DAC on the RF front end; (2) augments the data with GPS pulse-per-second information for synchronization; (3) performs a subset of the real-time signal processing and waveform generation tasks; (4) buffers the samples using on-chip and external RAM; and (5) forwards the samples to the SSD via a SATA link. The FPGA is also capable of efficiently performing highly optimized tasks such as filtering, Doppler compensation, tracking, and demodulation, thereby reducing subsequent data rates in real time.

The FPGA has more than 900 multiply-accumulate (MAC) blocks and is capable of running fixed-point DSP algorithms at a rate of 900 MAC operations per sample at 200 MHz sample rates, exceeding the performance goal of 100 real-time operations per sample. The tightly coupled interface between the FPGA and the local ARM cores allows a portion of the real-time signal processing to be implemented in modern programming languages (reducing costs for development), while still maintaining high throughput.

For missions requiring more heavy-duty processing, the digitized data can be offloaded to a neighboring CPU/GPU CoM board with fast and powerful cores and the ability to parallelize processing tasks for even greater speedup. An example choice, the Toradex Apalis CoM, utilizes the NVIDIA Tegra SoC. Tegra X1, the latest mobile processing chip in the Tegra family, combines 8 CPU cores with 256 CUDA-compatible GPUs into a power-efficient design capable of 512 GFLOP/s. The CoM can efficiently handle sophisticated on-board processing and eliminate the need to downlink raw samples, thus reducing downlink bandwidth requirements. The Tegra chip architecture allows one to aggressively scale CPU cores and CPU clock frequencies depending on the computational load. The architecture also supports a number of low power modes, such as sleep and deep sleep, such that the Tegra consumes very little power when idle. By using a COTS CoM, the need to develop a complex custom printed circuit board for the Tegra chip is bypassed, thus developing a more cost-effective solution. The Tegra CoM includes 2 GB DDR3 RAM, 8 GB NAND Flash, and Ethernet PHY.

The digitized data from the Zynq FPGA is transferred to the Tegra CoM in one of two ways: 1) directly, via a gigabit Ethernet bus to support the goal of powerful inline processing (~1 ms latency, 25 MS/s for up to 20 MHz sub-bands); or 2) via external SSDs to support the goal of full-bandwidth sophisticated post-processing.

The Tegra also functions as the main payload computer. It interfaces to the spacecraft via an Ethernet link, enables/disables RFPU subsystems, controls the Zynq's operational parameters via an SPI link, and collects and reports telemetry. This enables the Zynq and the SSDs to remain powered off when the system is idle.

Data Storage Capability: Non-volatile, Real-time, and High-throughput. The disclosed designs achieve deep non-volatile storage via SSDs that are accessed using high-speed SATA bus interfaces. The Zynq and Tegra processors share access to the SSDs via a SATA mux/demux network based on readily available COTS integrated circuits (ICs). By choosing the SATA standard and COTS SSDs, these designs can be easily modified to keep up with and to leverage continuous improvements in the SSD controller and Flash technology. An alternative implementation, where data is written directly to Flash memory integrated on a custom PCB, offers no such flexibility. Furthermore, direct-to-Flash storage is typically limited to 256 GB, in contrast to the 2 TB storage that each SSD can provide.

The Xilinx Zynq-7000 has the high-speed serial transceivers needed to support the SATA protocol. We implement the SATA host controller directly on the Zynq FPGA fabric, allowing digitized RF samples to be written straight through to the SSDs. Alternative approaches of writing to non-volatile storage require a significant amount of gateway hardware (e.g., PCIe-to-SATA). The on-chip SATA host capability removes the need for additional gateway logic, which reduces complexity and leads to a more compact and power-efficient design.

The disclosed designs utilize parallelized storage to address the high-bandwidth program goals. Digitized RF data inherently lends itself to parallelized storage because it contains independent I and Q channel samples. By writing the I/Q samples to separate SSDs (with a synchronization header that ensures the samples can be time-aligned during post-processing), the achievable write-throughput is nearly doubled. The maximum effective write throughput for SATA II is ~240 MB/s, or >400 MB/s for two drives. At 16 bits per channel, the combined throughput supports the >200 MHz performance goal. The parallelized approach avoids the complexity of a more general RAID 0 implementation and also enables deeper storage (4 TB total for two SSDs).

A high-speed 14-bit ADC and SATA controller core have been successfully integrated with a Xilinx Kintex-7 FPGA and demonstrated write-through of the digitized I/Q samples to an SSD. Initial performance tests with a benchtop prototype demonstrate sustained recordings of greater than 150 MB/s write speeds at recording depths of 256 GB and word error rates ~0.3%. The peak power consumption is currently in the 9-12 W range. >400 MB/s throughput is expected by integrating a deeper DDR3 memory buffer to support SSD latency spikes, parallelizing the digitization/record for each I and Q channel, and switching to the more advanced Zynq FPGA.

SDR: Receiving and Demodulating Arbitrary Waveforms. the tightly coupled interface between the Zynq FPGA and embedded ARM cores is exploited to efficiently support the high sensitivity coherent reception of multiple waveforms such as phase shift keyed (PSK), quadrature amplitude modulation (QAM), frequency shift keyed (FSK), code division multiple access (CDMA), and orthogonal frequency-division multiplexing (OFDM). Doppler compensation is critical for these coherent demodulation techniques.

Figure 8:
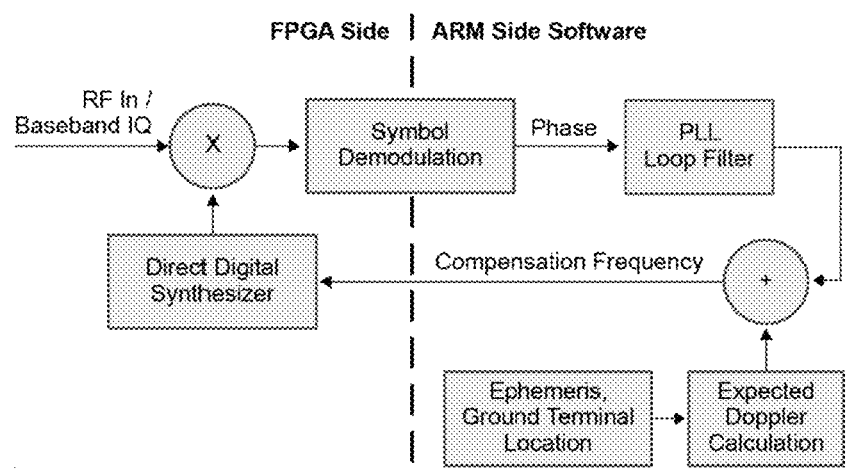
FIG. 8 shows an example signal flow in an example signal processing system.

An example Doppler compensation approach is illustrated in FIG. 8. A waveform-dependent symbol demodulator feeds phase information into software running on the Zynq ARM. The software PLL filter converts phase error to a correction frequency, which is then added to a feedforward Doppler frequency determined from the RFPU platform ephemeris and the RF transmitter location. The net tracking frequency is written back to the FPGA side of the Zynq, where it drives a Direct Digital Synthesizer (DDS). The DDS generates a Doppler compensation tone that is then mixed into the incoming signal. If the RF transmitter location is not known, the feed-forward Doppler will not be available. Many waveforms will work fine using the PLL alone, but performance may be degraded for other waveforms.

Figure 9:
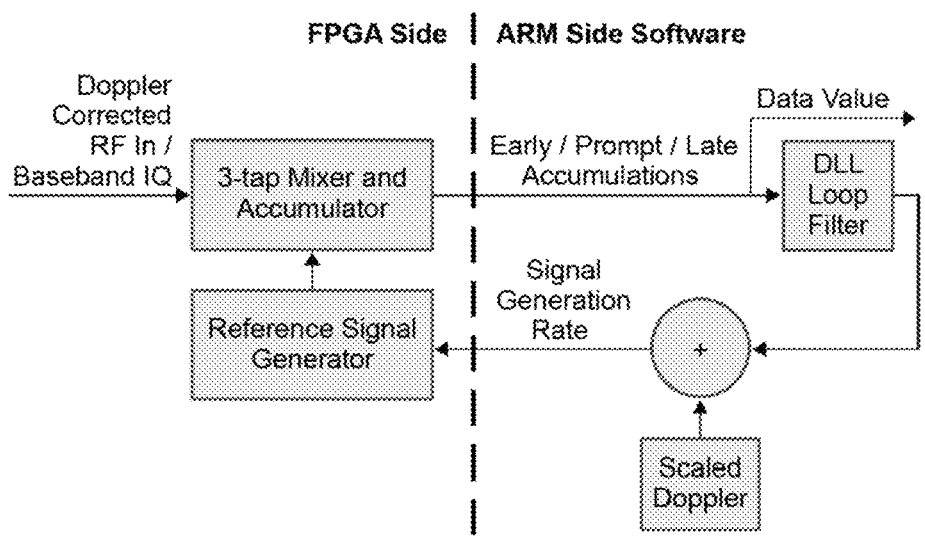
FIG. 9 shows an example signal flow in an example signal processing system.

Another example approach uses a delay tracking coherent receiver architecture (FIG. 9) for high-sensitivity coherent reception of time domain coherent waveforms. Exploiting the Zynq FPGA's ability to parallelize operations, the receiver mixes the Doppler-corrected complex baseband signal with three time-delayed replicas of the modulation-dependent reference signal. The mixer outputs are accumulated coherently over symbol durations, and complex values for Early, Prompt, and Late taps are forwarded to the ARM side of the Zynq. Software running on the ARM calculates the offset from the center of the three taps and feeds this offset back as an adjustment to the symbol rate in the FPGA. The RFPU's ability to modify parameters and change the reference signals creates a level of programmability that exceeds most delay tracking implementations. Flexibility is increased and development costs are further lowered by implementing the high rate accumulations and reference signals on the FPGA side and the tracking loop algorithms on the ARM side.

Figure 10:
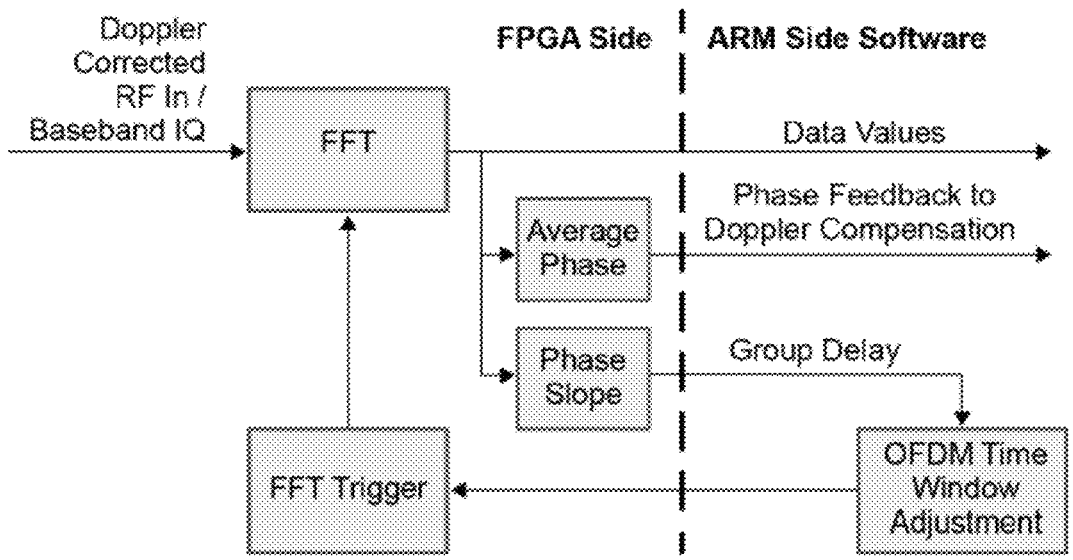
FIG. 10 shows an example signal flow in an example signal processing system.

Many modern communication standards use OFDM waveforms to transmit waveforms efficiently in complex multipath environments. An example OFDM symbol demodulation block can be implemented by building a fast Fourier transform (FFT) and timing state machine into the FPGA side of the Zynq (FIG. 10). The ARM side takes in the FFT outputs and calculates the average phase and the phase vs. frequency slope. The average phase is then fed to the Doppler compensation PLL, and the phase slope is fed to a delay-locked loop (DLL) that tracks symbol timing in a way that is similar to the time domain receiver described in FIG. 9.

Figure 11:
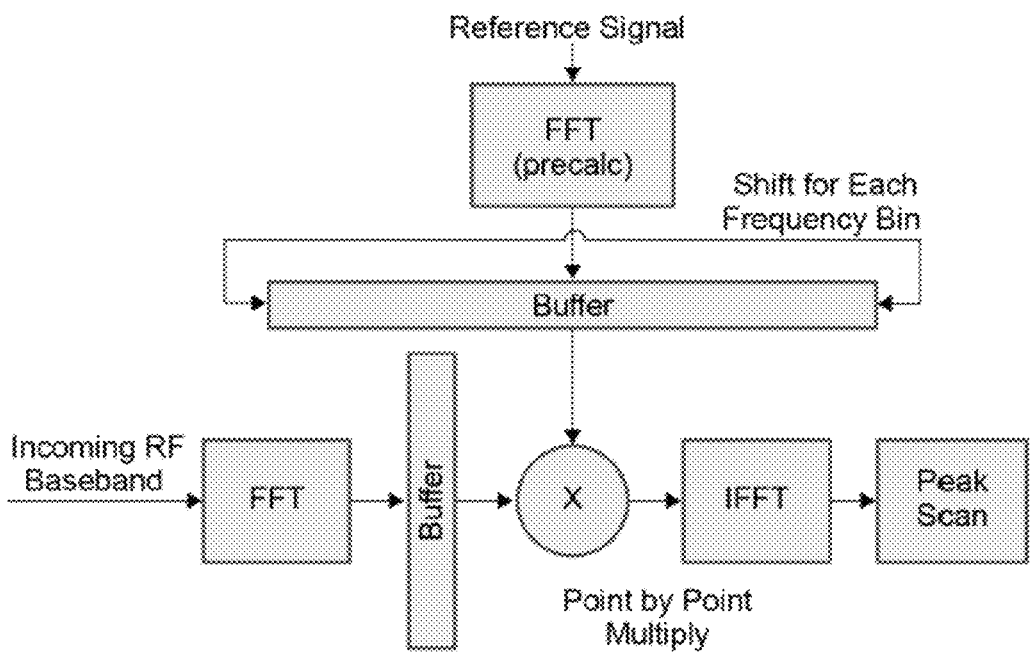
FIG. 11 shows an example signal flow in an example signal processing system.

The Tegra GPU component of the disclosed RFPU embodiments enables instantaneous signal detection and acquisition. Matched filter detection is employed over a wide range of frequency offsets to enable both fast initial communication signal acquisition when Doppler frequency is unknown, and high processing gain, continuous time detection of very brief interval signals such as might occur from low duty cycle beacons. The matched filters are implemented using the FFT algorithm and multiple sections of GPU cores to process multiple hypothesized Doppler shifts in parallel (FIG. 11). As an example, consider instantaneous (i.e., the first instance of the signal is detected) acquisition of a 100 µs reference signal, sampled at 10 MS/s, at a 2 GHz carrier from an emitter of unknown location. The parameters are similar to a W-CDMA cellular signal. Support for the full range of low-Earth-orbit Doppler shift (~+/−50 kHz) may require processing of 100 Doppler bins. For each Doppler bin, a 2048-point Inverse FFT is processed at a rate of 10 k/s, requiring about 1.1 GFLOP/s. All 100 Doppler bins will thus require about 110 GFLOP/s of processing. The Tegra GPU on the RFPU, which will have more than 500 GFLOP/s of processing power available, will enable acquisition of two or more of these types of signals simultaneously. This capability is impossible for a power-efficient CPU. Implementing the capability on an FPGA would involve significant development issues, such as converting from floating point to fixed point. The GPU is best suited to high-bandwidth processing that can tolerate millisecond-level latencies.

Software Defined Radio: Arbitrary Waveform Generation and Transmission. The RFPU can generate a variety of radio waveforms for transmission (e.g., BPSK, OQPSK, FSK, QAM, CDMA, OFDM), and Doppler compensation is possible by reversing the receive procedure described in FIG. 8. Waveform generation can occur in either the ARM or FPGA side of the Zync SoC, depending on the type of waveform. Highly complex yet repetitive waveforms are best generated from software on the ARM. The ARM then loads the generated waveform set into Block RAM buffers in the FPGA and also provides a parameterized (e.g., rate and duration) trigger generator to time the waveforms. On trigger, the FPGA transmits the waveform from the Block RAM buffer to the DAC via the complex baseband I/Q output. The 2 MB Block RAM of the Zynq 7045 limits the length of the waveform to 2.5 ms at 200 MS/s, but off-chip DDR3 memory can be employed to extend this depth by many orders of magnitude. If narrower band-width waveforms are transmitted, the available FPGA memory can be stretched by using a lower sample rate and including a digital upconverter to upsample the data in the FPGA prior to the DAC.

Communication signals are best generated with high rate modulation implemented on the FPGA and with the data bits provided by the ARM. This approach supports continuous communication without loading the ARM with detailed sample generation and without using up FPGA memory. To transmit CDMA signals, for example, the ARM provides data via FIFO buffers into the FPGA, and the FPGA generates the spreading code at a higher rate and then combines the two for transmission. Many spreading codes are generated by combining multiple feedback shift registers, which are amenable to FPGA implementation. To transmit OFDM signals, an inverse FFT implemented on the FPGA generates the DAC input samples from incoming frequency domain data symbols in a process that is the inverse of what is described for OFDM reception (FIG. 10). The FPGA and ARM provide a high level of flexibility in how waveforms are generated and data are transmitted; different options are selectable via different firmware loads.

The disclosed architecture also supports standard military SATCOM waveforms, which are often intended to pass as a continuous wave through a bent-pipe non-processing transponder. The RFPU has the low-latency processing power to support demodulating and remodulating these waveforms, instead of simply repeating them, providing lower link bit error rates than existing waveform repeaters.

There are only minimal platform support requirements: a 12 V unregulated input from the batteries (downconverted for the 3.3 and 5 V electronics and upconverted for the RF transmitter components) and an Ethernet connection for moving commands, status, and data between the spacecraft bus and the RFPU. The notional lifetime of the RFPU subsystem is at least 2 years.

Minimizing Power Consumption. The pathfinder RFPU in its full operational processing mode with active sensing will consume <30 W—well under both the 100 W power requirement of the pathfinder RFPU and the 50 W power requirement of the prototype RFPU. The pathfinder RFPU has multiple power modes to minimize parasitic power consumption on the satellite bus as shown in FIG. 7. The tabulated power numbers represent worst-case instantaneous peak values estimated from the datasheets of the individual components, with an added 10% margin. The RFPU can be turned off when not in use to achieve zero power consumption. An Ethernet interface between the spacecraft and an embedded Linux microcontroller on the Tegra CoM enables the RFPU to be turned back on and fully functional in seconds.

The following is an example boot-up sequence: (1) the bus applies power to the RFPU and the Tegra CoM boots into Linux. (2) After ~10 s, the RFPU is ready to receive commands and the Tegra goes into sleep mode, but can be woken up by incoming Ethernet packets from the bus. (3) The spacecraft commands the desired mode of operation via Ethernet packets. (4) The Tegra controls the RFPU on-board power switching circuit, which powers on the required RFPU subsystems depending on the desired mode. These subsystems will boot in <1 s. (5) When all subsystems are fully powered, the Tegra signals the RFPU readiness to the spacecraft.

FIG. 7 outlines various power modes and corresponding power consumption levels. The power levels are arranged in order of increasing power use and corresponding increased system operational capacity. Lower-power modes (e.g., modes 1, 2, and 3) correspond to the system in various idle states, with the majority of the system either idle or fully powered off. Higher-power modes include operating the RF frontend (e.g., to generate radar data and/or to communicate with external systems), recording data, and/or processing data that is being generated and/or that has been previously generated and stored.

The disclosed designs achieve higher-performance and greater flexibility than alternative approaches. Several attributes distinguish it from alternative options:

Wide frequency coverage (100 MHz-9 GHz): A converter stage extends the supported frequency range higher than most existing SDRs (<6 GHz upper limit) for extended mission capabilities like high-resolution SAR or high-rate communications.

Flexible RF front end: Most SDRs severely restrict the operating frequency by requiring the user to select a specific RF amplifier module for their custom application. The disclosed design provides the option to switch on the fly between multiple PAs.

Deep, non-volatile storage with high dynamic range: Available SDRs can capture only short bursts of high rate data, but the presently disclosed solution provides 1.5-hour-long recording capabilities for the full 200 MHz at full dynamic range (~72 dB). This capability enables missions that might desire human-in-the-loop processing without being constrained by the "snapshots" that most systems support. Other supported missions are those involving on-board processing that might utilize data across many passes and need to store them each in their raw form.

Low-latency processing: SDR systems typically use an Ethernet-like link from the FPGA to a higher-level compute resource, limiting the reaction time and the real-time performance. When real-time systems are implemented, they must be highly buffered (if the solution allows) or implemented in the FPGA (if the processing capacity exists). Only a tightly coupled FPGA/CPU architecture enables processing at 10 µs scale of delay.

High-performance, power-efficient computing: the disclosed layered processing approach enables the optimal balance of FPGA/GPU/CPU computing resources in one compact power-efficient package, providing the best of low latency/integer oriented processing (FPGA), higher level language programming (CPU), and heavy duty floating point processing (GPU).

Adaptable: the disclosed design provides a simple upgrade pathway to take advantage of new generation COTS components, such as higher-capacity mSATA harddrives, faster and more power-efficient CPUs and GPUs (e.g., newer SoCs), and improved RF power amplifiers.

At the core of an example high speed TX/RX Processor module is the Xilinx Kintex-7 FPGA device, chosen for its low power consumption and on-chip transceivers that can sustain Serial ATA (SATA) speeds of 6 Gbit/s. The FPGA performs the following key functions: (1) generates the transmit waveform, (2) controls the radar gating and provides the reference clock (+/−0.28 ppm accuracy) to the TX/RX module, (3) interfaces with the ADC and receives radar I/Q samples, (4) augments the data with GPS pulse-per-second information for synchronization, (5) buffers the samples using on-chip block RAM, and (6) forwards the samples to the SSD via a SATA link.

Figure 5D:
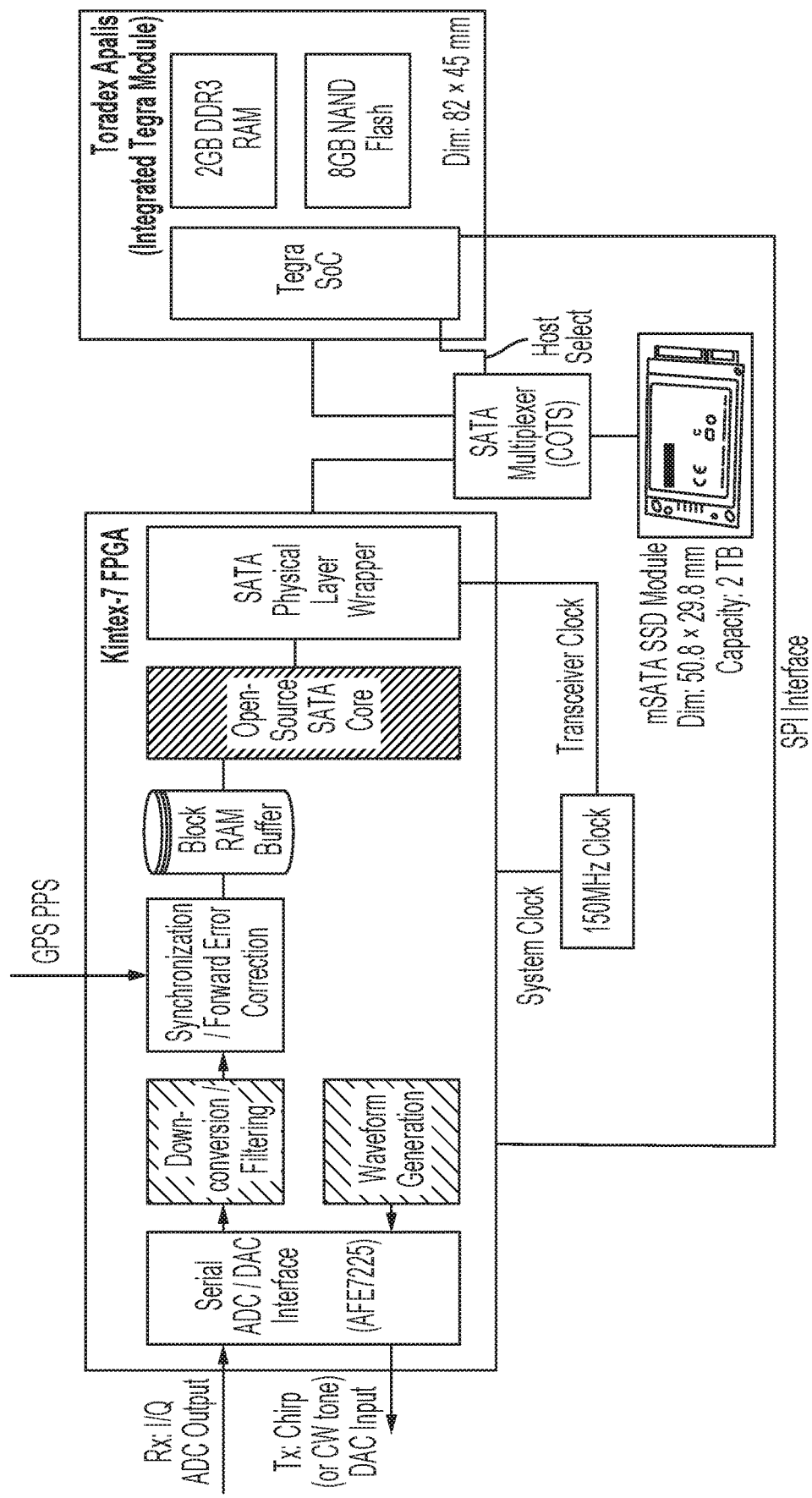
FIG. 5D is a schematic of an example controller.

Post-processing of the radar data is performed on the NVIDIA Tegra 3 system-on-a-chip (SoC), which combines a quad-core 1.6-GHz ARM Cortex-A9 CPU with a 12-core 512-MHz graphical processing unit (GPU). The GPU can be leveraged by the on-board signal processing algorithms to achieve significant speedup. In addition, Tegra 3 includes an on-die SATA controller module, which allows it to connect to the SSD without additional bridge components. FIG. 5D illustrates the High Speed TX/RX Processor module in greater detail.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached," or "coupled" to another feature or element, it can be directly connected, attached or coupled to the other feature or element or intervening features or elements may be present. To contrast, when a feature or element is referred to as being "directly connected", "directly attached," or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary tem1 "under" can encompass both an orientation of over and under. The device may be otherwise oriented (rotated 90 degrees or at other orientations) and the spatially relative descriptors used herein interpreted accordingly. Similarly, the terms "upwardly," "downwardly", "vertical", "horizontal" and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1%, of the stated value (or range of values), +/−2%, of the stated value (or range of values), +/−5%, of the stated value (or range of values), +/−10% of the stated value (or range of values), etc. Any numerical range recited herein is intended to include all sub-ranges subsumed therein.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others.

Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

V. Conclusion

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A radar system providing increased sample storage bandwidth for storage of baseband samples of radar signals between 100 MHz and 9 GHz with reduced power and cost, the radar system comprising:
    a digital-to-analog converter;
    a transmitter, wherein the transmitter is configured to receive one or more outputs from the digital-to-analog converter and generate a radar output signal therefrom;
    a receiver, wherein the receiver is configured to receive a radar input signal and output one or more demodulated output signals;
    an analog-to-digital converter, wherein the analog-to-digital converter is configured to receive the one or more demodulated output signals from the receiver;
    a first non-volatile storage interface and a second non-volatile storage interface; and
    a controller, wherein the controller comprises one or more processors configured to:
    operate the digital-to-analog converter and the transmitter to generate the radar output signal; and
    operate the analog-to-digital converter and the receiver to generate a plurality of samples of the one or more demodulated output signals, wherein the one or more demodulated output signals are related to the generated radar output signal;
    wherein the controller comprises a programmable logic device that is coupled to the analog-to-digital converter and to the first and second volatile storage interfaces, and wherein the programmable logic device is configured to (i) receive the generated plurality of samples from the analog-to-digital converter, (ii) transmit a first subset of the generated plurality of samples via the first non-volatile storage interface, and (iii) transmit a second subset of the generated plurality of samples via the second non-volatile storage interface, whereby the first and second subsets of the generated plurality of samples are recorded into non-volatile storage at reduced power relative to transmitting the first and second subsets via a single non-volatile storage interface.

2. The radar system of claim 1, wherein the receiver is configured to:
    receive the radar input signal; and
    output an in-phase signal and a quadrature signal,
        wherein the first subset of the generated plurality of samples are samples of the in-phase signal, and
        wherein the second subset of the generated plurality of samples are samples of the quadrature signal.

3. The radar system of claim 1, wherein the first subset of the generated plurality of samples comprises even samples of the plurality of samples and wherein the second subset of the generated plurality of samples comprises odd samples of the plurality of samples.

4. The radar system of claim 1, further comprising:
a third non-volatile storage interface, wherein the programmable logic device is additionally configured to (iv) transmit a third subset of the generated plurality of samples via the third non-volatile storage interface.

5. The radar system of claim 1, wherein the transmitter comprises a modulator that is configured to modulate the one or more outputs from the digital-to-analog converter using a local oscillator signal, and wherein the receiver comprises a demodulator that is configured to generate the one or more demodulated output signals using the local oscillator signal.

6. The radar system of claim 5, wherein the modulator is part of an integrated circuit, and wherein the local oscillator signal is generated by an oscillator that is part of the same integrated circuit as the modulator.

7. The radar system of claim 1, wherein the programmable logic device comprises a field-programmable gate array.

8. The radar system of claim 1, wherein the analog-to-digital converter comprises a decimator.

9. The radar system of claim 1, further comprising:
an antenna port; and
a first switch coupled to the transmitter, the antenna port, and the receiver, wherein the first switch is operable to controllably direct the radar output signal from the transmitter to one of the antenna port or the receiver;
wherein the radar output signal comprises a plurality of transmit pulses, and wherein the radar output signal additionally comprises, for each of the transmit pulses, a corresponding calibration pulse, wherein the controller is additionally configured to operate the first switch to direct the transmit pulses to the antenna port and to direct the calibration pulses to the receiver, and wherein the one or more demodulated output signals are related to the plurality of transmit pulses and the plurality of calibration pulses.

10. A method providing increased sample storage bandwidth for storage of baseband samples of radar signals between 100 MHz and 9 GHz with reduced power and cost, the method comprising:
operating a digital-to-analog converter and a transmitter to generate a radar output signal, wherein the transmitter is configured to receive one or more outputs from the digital-to-analog converter and generate the radar output signal therefrom;
operating an analog-to-digital converter and a receiver to generate a plurality of samples of one or more demodulated output signals, wherein the one or more demodulated output signals are related to the generated radar output signal, wherein the receiver is configured to receive a radar input signal and output one or more demodulated output signals, and wherein the analog-to-digital converter is configured to receive the one or more demodulated output signals from the receiver;
receiving, by a programmable logic device, the generated plurality of samples from the analog-to-digital converter;
transmitting, by the programmable logic device, a first subset of the generated plurality of samples via a first non-volatile storage interface; and
transmitting, by the programmable logic device, a second subset of the generated plurality of samples via a second non-volatile storage interface, whereby the first and second subsets of the generated plurality of samples are transmitted to respective non-volatile storage mediums via the first and second non-volatile storage interfaces at reduced power relative to transmitting the first and second subsets via a single non-volatile storage interface.

11. The method of claim 10, wherein the receiver is configured to:
receive the radar input signal; and
output an in-phase signal and a quadrature signal,
wherein the first subset of the generated plurality of samples are samples of the in-phase signal, and wherein the second subset of the generated plurality of samples are samples of the quadrature signal.

12. The method of claim 10, wherein the first subset of the generated plurality of samples comprises even samples of the plurality of samples and wherein the second subset of the generated plurality of samples comprises odd samples of the plurality of samples.

13. The method of claim 10, further comprising:
transmitting, by the programmable logic device, a third subset of the generated plurality of samples via a third non-volatile storage interface.

14. The method of claim 10, wherein the radar output signal comprises a plurality of transmit pulses, and wherein the radar output signal additionally comprises, for each of the transmit pulses, a corresponding calibration pulse, and wherein the method further comprises:
operating a first switch to direct the transmit pulses to an antenna port and to direct the calibration pulses to the receiver, wherein the one or more demodulated output signals are related to the plurality of transmit pulses and the plurality of calibration pulses.

15. A radar system providing improved versatility and accuracy for generation and sampling of radar signals between 100 MHz and 9 GHz at reduced power and reduced component cost, the radar system comprising:
a digital-to-analog converter;
a transmitter, wherein the transmitter is configured to receive one or more outputs from the digital-to-analog converter and generate a radar output signal therefrom;
an antenna port;
a receiver, wherein the receiver is configured to receive a modulated input signal and output one or more demodulated output signals;
a first switch coupled to the transmitter, the antenna port, and the receiver, wherein the first switch is operable to controllably direct the radar output signal from the transmitter to one of the antenna port or the receiver;
an analog-to-digital converter, wherein the analog-to-digital converter is configured to receive the one or more demodulated output signals from the receiver; and
a controller, wherein the controller comprises one or more processors configured to:
operate the digital-to-analog converter and the transmitter to generate the radar output signal, wherein the radar output signal comprises a plurality of transmit pulses, and wherein the radar output signal additionally comprises, for each of the transmit pulses, a corresponding calibration pulse;
operate the first switch to direct the transmit pulses from the transmitter to the antenna port and to direct the calibration pulses from the transmitter to the receiver, whereby a calibration pulse may be provided for each transmit pulse in order to improve the accuracy of radar outputs generated therefrom while reducing power; and
operate the analog-to-digital converter and the receiver to generate a plurality of samples of the one or more demodulated output signals, wherein the one or more demodulated output signals are related to the plurality of transmit pulses and the plurality of calibration pulses.

16. The radar system of claim 15, wherein the first switch is a silicon-on-insulator switch.

17. The radar system of claim 15, wherein the first switch is a silicon-on-sapphire switch.

18. The radar system of claim 15, wherein an output of the first switch is coupled to an input of the receiver via a directional coupler.

19. The radar system of claim 15, wherein the receiver and an output of the first switch are coupled to the antenna port via a circulator.

20. The radar system of claim 15, further comprising:
an amplifier, wherein the amplifier couples an output of the first switch and the antenna port.

21. The radar system of claim 15, wherein generating the radar output signal comprises generating the radar output signal such that the plurality of transmit pulses are generated at a specified frequency that exceeds 600 Hertz.

22. A method providing radar operations with improved versatility and accuracy for generation and sampling of radar signals between 100 MHz and 9 GHz at reduced power and using reduced-cost hardware, the method comprising:
operating a digital-to-analog converter and a transmitter during a first plurality of periods of time to generate a plurality of transmit pulses, wherein the transmitter is configured to receive one or more outputs from the digital-to-analog converter and to generate a radar output signal therefrom;
operating a first switch, during the first plurality of periods of time, to direct the radar output signal from the transmitter to an antenna port;
operating an analog-to-digital converter and a receiver to generate a first plurality of samples of one or more demodulated output signals, wherein the receiver is configured to receive a modulated input signal and output the one or more demodulated output signals to the analog-to-digital converter, wherein the one or more demodulated output signals are, during the first plurality of periods of time, related to the plurality of transmit pulses;
operating the digital-to-analog converter and the transmitter during a second plurality of periods of time to generate a plurality of calibration pulses, wherein periods of time of the first plurality of periods of time alternate with periods of time of the second plurality of periods of time;
operating the first switch, during the second plurality of periods of time, to direct the radar output signal from the transmitter to the receiver, whereby a calibration pulse may be provided for each transmit pulse in order to improve the accuracy of radar outputs generated therefrom while reducing power; and
operating the analog-to-digital converter and the receiver to generate a second plurality of samples of one or more demodulated output signals, wherein the one or more demodulated output signals are, during the second plurality of periods of time, related to the plurality of calibration pulses.

23. The method of claim 22, wherein generating the plurality of transmit pulses comprises generating the plurality of transmit pulses at a specified frequency that exceeds 600 Hertz.

* * * * *